(12) United States Patent
Vasquez, Jr. et al.

(10) Patent No.: US 10,121,112 B1
(45) Date of Patent: Nov. 6, 2018

(54) SYSTEMS AND METHODS FOR IMPROVED MANAGEMENT OF CONSTRUCTION PROJECT DATA

(71) Applicant: Hyphen Solutions, LLC, Addison, TX (US)

(72) Inventors: Felix Vasquez, Jr., Southlake, TX (US); Christopher F. Sugg, Grapevine, TX (US); Brent B. Beseda, Carrollton, TX (US)

(73) Assignee: Hyphen Solutions, LLC, Addison, TX (US)

( * ) Notice: Subject to any disclaimer, the term of this patent is extended or adjusted under 35 U.S.C. 154(b) by 794 days.

(21) Appl. No.: 14/250,339

(22) Filed: Apr. 10, 2014

(51) Int. Cl.
*G06Q 10/06* (2012.01)
*G06Q 30/02* (2012.01)

(52) U.S. Cl.
CPC ... *G06Q 10/06313* (2013.01); *G06Q 30/0207* (2013.01); *G06Q 30/0234* (2013.01)

(58) Field of Classification Search
CPC ......... G06Q 10/06313; G06Q 30/0234; G06Q 30/0207
USPC ................................... 705/7.23, 14.1, 14.34
See application file for complete search history.

(56) References Cited

U.S. PATENT DOCUMENTS

| 5,689,705 A * | 11/1997 | Fino ....................... G06Q 30/02 |
| 2001/0027407 A1 | 10/2001 | Mod |
| 2002/0099617 A1 * | 7/2002 | Fogelson ............... G06Q 30/02 705/14.39 |
| 2002/0152119 A1 * | 10/2002 | Kepros ............... G06Q 30/0207 705/14.26 |
| 2003/0064705 A1 * | 4/2003 | Desiderio ............. G06Q 30/06 455/412.1 |
| 2003/0115115 A1 | 6/2003 | Ouchi |
| 2004/0236619 A1 | 11/2004 | Gundersen et al. |
| 2009/0163228 A1 * | 6/2009 | Blumberg ............. G01C 21/20 455/456.3 |
| 2010/0182631 A1 * | 7/2010 | King ..................... G06F 17/243 358/1.15 |

(Continued)

OTHER PUBLICATIONS

Scanbacks and direct rebates: manufacturer's tools against forward buying. Arcelus, F. J.; Srinivasan, G. International Transactions in Operational Research10.6: 619-35. Blackwell Publishers. (Nov. 2003).*

(Continued)

*Primary Examiner* — Timothy Padot
(74) *Attorney, Agent, or Firm* — Norton Rose Fulbright US LLP

(57) ABSTRACT

A method includes receiving location information, and determining one or more addresses based on the location information. At least one of the one or more addresses is associated with a construction site. The method includes presenting the one or more addresses as selectable elements within a first graphical user interface, and in response to receiving an input indicating selection of a particular selectable element within the first graphical user interface, receiving a second input corresponding to a request to capture item data, and capturing item data in response to the second input. The method includes storing the captured item data in association with a builder at a database. The captured item data is associated with a specific product provided by a vendor in association with construction of a home.

20 Claims, 12 Drawing Sheets

(56) References Cited

U.S. PATENT DOCUMENTS

2012/0246024 A1\* 9/2012 Thomas ................ G06Q 30/06
                                                    705/26.41
2013/0110572 A1   5/2013 Eagan
2013/0283106 A1  10/2013 King et al.
2014/0143039 A1\* 5/2014 Branton ............. G06Q 30/0223
                                                    705/14.24
2014/0316614 A1  10/2014 Newman
2015/0097669 A1   4/2015 Li

OTHER PUBLICATIONS

PlusNetMarketing Introduces Intelligent Rebate Coupon for Retail Industry. Business Wire Nov. 22, 2010: NA.\*
Toriello, M., "Linking Contractors and Suppliers," National Home Center News, p. 19, Mar. 20, 2000, 1 page.

\* cited by examiner

| | | | | | | | | |
|---|---|---|---|---|---|---|---|---|
| | | PO Configuration Interface | | | | 302 | PO - ID | |
| 310 — ⊞ 312 | | 410 - Venting - Rough | | | | | 314 — ☐ | |
| 320 — ⊞ 322 | | 370 - Electric - Rough | | | | | 324 — ☐ | |
| 330 — ⊟ 332 | | 490 - Appliances - Rough | | | | | 334 — ☐ | |
| 340 — Original Item Description: Appliances2 | | Quantity: 1 | Total Price: $2,500 | | | | | |
| | SKU | Description | Location | Qty | Price | | | |
| 350 — Kitchen: | 🔍 | | ▼ | 0 | $0.00 | Notes | Delete | |
| 360 — Installation: | 🔍 | | ▼ | 0 | $0.00 | Notes | Delete | |
| 370 — Parts & Accessories: | 🔍 | | ▼ | 0 | $0.00 | Notes | Delete | |

Add Row 390   Confirm 392   Update 394

Fig. 3

SYSTEMS AND METHODS FOR IMPROVED MANAGEMENT OF CONSTRUCTION PROJECT DATA

CROSS-REFERENCE TO RELATED APPLICATIONS

The present application is related to co-pending U.S. patent application Ser. No. 14/250,324, filed Apr. 10, 2014, entitled "CLOSED NETWORK PO DETAIL COMMUNICATION," filed concurrently herewith, the content of which is expressly incorporated herein by reference.

FIELD OF THE DISCLOSURE

The present disclosure is generally related to systems, methods, and computer-readable storage devices that provide improved data management, information sharing, product distribution coordination, and tracking of product distribution in a supply chain.

BACKGROUND

In many business environments, multiple entities are involved in coordinating production, distribution, and delivery of a product to an end consumer. For example, in the construction industry, a builder may utilize third party vendors to build a structure (e.g., a new home) that may be tailored to the needs or desires of a purchaser (e.g., a home buyer). The third party vendors may include suppliers who provide materials to be used to build the structure, and contractors that build the structure using the materials provided by the supplier.

Prior to construction of the structure, the builder may contact each of the suppliers and contractors to request bids. The requests may detail the materials and/or services (e.g., labor and/or installation) to be provided during the construction of the structure, and the requests may be generated based on a detailed specification of the structure (e.g., a blueprint of the structure created by an architect). After the builder receives the bids from the suppliers and/or the contractors, the builder selects particular suppliers and particular contractors that the builder will use to build the structure.

For example, the builder may receive bids for lumber from multiple lumber suppliers, and may receive bids for services (e.g., framing the structure using the lumber) from multiple contractors. The builder selects one or more of the multiple lumber suppliers to provide the lumber to build the structure, and selects one or more of the multiple contractors to build the structure using the supplied lumber. In some instances, the builder may receive bids for both the materials and the services from the multiple contractors. In such instances, the multiple contractors may have requested and received bids for the materials from the multiple suppliers, and each of the multiple contractors may generate bids for the builder based on the bids the contractors received from the suppliers.

In some instances the bidding process may be very complex. For example, in a residential subdivision development, the builder may desire to construct many different types of homes, each having different sizes, different specifications, different materials requirements, and/or different services (e.g., labor) requirements. Further, a single home may be constructed in one of many different ways (e.g., different elevations) such that when two homes of the same type are built side-by-side within the subdivision, the two homes look different from the street. Thus, the suppliers and/or the contractors may each provide the builder with complex bids detailing the various different costs to the builder for each type of home and each configuration of a particular type of home.

After receiving the bids, the builder may input the bids from the selected suppliers and contractors into a database, generating a large amount of data. Presently, systems to process this data are subject to error, data loss, and may introduce delays for all of the entities involved in the construction process. For example, the builder may request a bid for lumber from two different lumber suppliers. The request may identify different types and quantities of lumber for each of the different types of homes that may be built. There are currently no industry standard identifiers for lumber (and most other construction materials), so the request sent to the supplier typically identifies the lumber using builder specific identifiers. Similarly, the lumber suppliers may each identify the lumber using their own supplier specific lumber identifiers. Thus, when each of the lumber suppliers receives the request, the lumber suppliers must first translate the builder specific identifiers into the lumber supplier's own supplier specific lumber identifiers. Further, when the bids are received by the builder, the builder must then translate each of the lumber supplier's supplier specific identifier into the builder's builder specific identifiers.

Translation of the party specific identifiers is presently done manually by data entry on a computer or by hand using pen and paper. These methods are time consuming, which may introduce delays into the bidding process. Additionally, such methods of translating the party specific identifiers are prone to human errors, which may cause delivery of incorrect materials to the construction site, receipt of incorrect bids, and may introduce further delays and increase costs as the correct materials must still be delivered and the incorrect materials must be removed from the construction site.

After the bidding process is complete, the builder offers homes for sale in the subdivision, and a home buyer may contract with the builder for construction of a new home. Prior to beginning construction of the new home, the home builder may provide the home buyer with numerous options for configuring the home. The configuration options may be arranged into packages which are tiered according to a desired price point and may also be classified according to an area of the home (e.g., kitchen, bath, garage, etc.) to which a particular package corresponds. The bids received by the builder may include a cost to the builder for each of the different configuration options.

For example, the builder may offer multiple packages associated with a configuration of kitchen appliances in the home. The kitchen appliance packages may include a base package, a mid-level package, and a luxury package. The home builder may increase the sales price of the home based on the particular kitchen appliance package selected by the home buyer. To illustrate, the base package may include a first set of appliances (e.g., an oven, a range, a refrigerator, and a dishwasher). Typically, the sales price of the home does not change when the home buyer selects the base package.

The mid-level package may include a second set of appliances that differ from the appliances included in the base package in some way. For example, the mid-level package may include the same appliances (e.g., an oven, a range, a refrigerator, and a dishwasher) as the base package, but the appliances included in the mid-level package may be of a different color than the appliances included base package (e.g., white appliances in the base package, black appliances in the mid-level package). As another example, the mid-level package may include additional appliances (e.g., a built-in microwave) that are not included in the base package. The builder typically increases the sales price of the home by a first amount above the base package sales price when the home buyer selects the mid-level package.

The luxury package may include a third set of appliances that differ from the appliances included in both the base package and the mid-level package in some way. For example, the luxury package may include the same appliances (e.g., an oven, a range, a refrigerator, and a dishwasher), but the appliances included in the luxury package may be of a different color than the appliances offered in the base package and the mid-level package (e.g., white appliances in the base package, black appliances in the mid-level package, and stainless steel appliances in the luxury package). As another example, the luxury package may include additional appliances (e.g., a double oven) that are not included in the base package or the mid-level package. The builder typically increases the sales price of the home by a second amount above the mid-level package sales price when the home buyer selects the luxury package.

The appliances included in a particular package may be selected from numerous different appliances made by one or more manufacturers, and a manufacturer of the particular appliances provided within the particular package may not affect the builder's cost. For example, the refrigerator provided when a home buyer selects the base package may be selected from among three different white refrigerators manufactured by three different manufacturers. From the builder's point of view, the particular refrigerator provided by the supplier is not important, since all three of the refrigerators satisfy the base package criteria (e.g., a white appliance) and do not increase the builder's cost. Thus, the builder creates and sends a purchase order to the supplier, requesting that the supplier provide base package kitchen appliances on a particular date. When the criteria that distinguish the different packages are unique, such as when the appliances provided for each package are distinguished only by a color of the appliances, purchase orders with high levels of data abstraction (e.g., simply requesting base package appliances) may not cause problems.

However, this is rarely the case with most construction projects. Typically, the criteria that distinguish the different packages are not unique. For example, each of the kitchen appliance packages may include appliances available in multiple colors (e.g., white, black, red, stainless steel, etc.), from multiple manufacturers, and in multiple styles. In such a scenario, simply requesting that the supplier provide base package kitchen appliances to the home does not provide the supplier with enough information.

To illustrate, assume the home buyer selects the base package with red appliances made by a first manufacturer. From the builder's standpoint, this order simply indicates a purchase of base package kitchen appliances, and the builder sends the supplier a purchase order requesting delivery of base package kitchen appliances to the home. This puts the supplier in the position of having to determine which particular appliances (e.g., which color, which manufacturer, which style, etc.) the supplier should deliver to the home in order to fulfill the purchase order. Presently, the supplier makes such determinations manually by emailing or calling the builder with a request for additional information, wasting time and resources of both the builder and the supplier.

The problems caused by the high levels of data abstraction (e.g., simply requesting delivery of base package kitchen appliances) used by builders in purchase orders are compounded when change orders are considered. For example, assume that the home buyer originally selected base package kitchen appliances, and the builder sends the supplier a purchase order requesting delivery of base package kitchen appliances on a particular date. After the purchase order was sent to the supplier, the home buyer changes their selection from the base package kitchen appliances to the mid-level package kitchen appliances. In some instances, either by human error or another cause, this change may not be reported to the supplier, causing the supplier to deliver the wrong kitchen appliances to the home. In other instances, the builder may inform the supplier of the change using a change order. However, the change order simply requests delivery of mid-level package kitchen appliances instead of base package kitchen appliances. The supplier must again contact the builder for more information in order to determine the specific mid-level package kitchen appliances that the supplier is to deliver, wasting additional time and additional resources of both the builder and the supplier.

Change orders may also introduce delays and additional costs. For example, the builder may process the change order immediately after receiving the change request from the home buyer, but it may take a few days for the change order to reach the supplier (or the appropriate personnel at the supplier), introducing a delay. When the change order is sent to the supplier near the delivery date, the supplier may not process the change order in time, causing the supplier to deliver the base package kitchen appliances indicated in the purchase order, rather than the mid-level package kitchen appliances indicated in the change order. The supplier often incurs the additional cost of delivering the correct kitchen appliances (e.g., the appliances indicated in the change order), and the cost of transporting the incorrect kitchen appliances (e.g., the appliances indicated in the purchase order) back to the supplier's facility. If the appliances have already been installed (e.g., either by the supplier or by a contractor), the supplier also incurs the additional costs associated with the removal of the incorrect appliances, and for the installation of the correct appliances.

In addition to introducing errors, delays, and increased costs, presently available data management systems for the construction industry do not provide data analysis tools that enable industry wide market analysis and product tracking capabilities. For example, a manufacturer (e.g., an appliance manufacturer) may produce a product (e.g., a refrigerator) that is purchased by one or more wholesalers. The wholesalers may then sell the product to one or more retailers (e.g., the suppliers described above) that then sell the product to end consumers (e.g., the contractors and/or the builder described above). In this example, the supply chain flows from the manufacturer to the one or more wholesalers to the one or more retailers and then finally to the end consumers.

Typically, the parties involved in the supply chain are most concerned with the receipt of the product from a direct upstream source, and the flow of the product to one or more downstream destinations that the party provides the product to. For example, the manufacturer, as an origin of the product, receives payment for manufacturing the product at the time the product is sold and/or delivered to the one or more wholesalers. Thus, the manufacturer may be most interested in the flow of the product from the manufacturer to the one or more wholesalers, and may not be that concerned with the flow of the product from the one or more wholesalers to the one or more retailers. As a result, the manufacturer may track information associated with the product to the point of sale of the product to the one or more wholesalers, but may be unable to track distribution of the product through the supply chain from the one or more wholesalers to the end consumer. Some manufacturers rely on the end consumer to notify the manufacturer of the purchase of the product by including mail-in inserts included in the product's packaging. This method of information tracking is problematic in the home construction industry because the end consumer takes delivery of the product after the product has been removed from the packaging and may not receive the mail-in insert. The inability to track information associated with the end consumers of the product may be problematic for the manufacturer in certain situations, such as when a product recall occurs, because the manufacturer may have difficulty notifying the end consumer of the recall.

As another example, each of the one or more retailers may be interested in finding the best purchase price for the product, and in finding the largest number of end consumers to purchase the product. Accordingly, the one or more retailers may be interested in the receipt of the product from the one or more wholesalers (e.g., the direct upstream sources of the product in the supply chain), and may also be interested in the flow of the product to the end consumers. Thus, the various parties in the supply chain may have diverging areas of interest, and, as a result, may track different information relating to the product, making it difficult to track trends and forecast future demand for the product.

For example, the manufacturer may be located in a first location (e.g., a first city) and may sell the product to wholesalers serving various geographic regions (e.g., a state or a group of states). The wholesalers may then sell the product to retailers that have a large number of locations (e.g., numerous locations in a large number of cities across a large number of states). Data tracked by the manufacturer may only indicate that the product was sold in the geographic regions associated with the wholesalers, and data tracked by the wholesaler may identify the locations where the retailer received delivery of the product. The manufacturer is unable to determine, based on the data tracked by the manufacturer, that the product was purchased from the wholesalers in large quantities by retailers in particular locations (e.g., the south), and was purchased from the same wholesalers in smaller quantities by the same retailers in other locations (e.g., the north). Thus, the manufacturer may not be able to determine that marketing efforts for the product should be more focused in the particular locations where the larger quantities of the product are sold, or that additional marketing efforts should be directed to the locations where the smaller quantities of the product were sold (i.e., in order to try and increase sales in those locations).

Additionally, some of the parties in the supply chain may be interested in influencing the behavior of other parties in the supply chain. For example, the manufacturer may attempt to influence an end consumer to purchase the manufacturer's product by offering a rebate to the end consumer for purchasing the product or some other product related criterion (e.g., purchasing a threshold quantity of the product). As described above, each party in the supply chain may identify the product using a party specific identifier. For example, the manufacturer identifies the product using a manufacturer specific identifier, the one or more wholesalers identify the product using wholesaler specific identifiers, and the one or more retailers may identify the product using retailer specific identifiers. As can be appreciated, the number of party specific identifiers used to identify the product by the various parties may grow extremely large.

For example, the product may be provided to multiple wholesalers, each having their own unique wholesaler specific identifier for the product, who then provide the product to multiple retailers, each having their own unique retailer specific identifier for the product. When a single retailer purchases the product from multiple wholesalers, the single retailer may use multiple retailer specific identifiers (e.g., one retailer specific identifier for each wholesaler) to identify the product. Because each party in the supply chain has their own party specific identifier (and sometimes multiple party specific identifiers), the manufacturer may have difficulty verifying that a product purchased by the consumer qualifies for the rebate.

As an example, in the construction industry a manufacturer (e.g., a faucet manufacturer) may offer a builder a rebate for installing the manufacturer's products (e.g., faucets) in a home. In some instances the rebate may be offered on a per faucet basis, such that the builder qualifies for one rebate for each faucet installed in a home built by the builder (i.e., if the builder installs four faucets the builder qualifies for four rebates). In other instances the rebate may be offered on a per home basis, such that the builder qualifies for one rebate for each home that the builder installs the manufacturers faucets in, or a threshold quantity of faucets in (i.e., the builder qualifies for one rebate for every home the builder outfits with the manufacturers faucets).

However, as explained above, many builders use high levels of data abstraction when recording information pertaining to a home being built. For example, the builder may simply indicate base package faucets or some other generic description that indicates the faucets to be installed in the home. The high level of data abstraction used by many builders, in conjunction with the manufacturers inability track downstream distribution of products (e.g., from wholesalers to retailers to end consumers), may make it difficult for the manufacturer to verify that the builder qualifies for a particular rebate. This may cause manufacturers to pay additional rebates to a builder that the builder did not qualify for, or may cause the builder to receive less in rebates that the builder was entitled to.

As an example of how difficult tracking rebates in the construction industry presently is, some people in the construction industry estimate that manufacturers incur one and a half dollars (e.g., $1.50) in tracking costs for every dollar (e.g., $1.00) offered in rebates. If tracking of products could be reduced, manufacturers could offer builders larger rebates, which may reduce the cost to purchase a new home for a home buyer or increase the profits of the home builder. Additionally, the manufacturer could realize a larger profit on the sale of the product. Thus, there remains a need for systems that provide tools for data management, information sharing, product distribution coordination, and product tracking that overcome the limitations described above with respect to presently available systems.

SUMMARY

Disclosed herein are illustrative aspects of systems, methods, and computer-readable storage devices for coordinating the dissemination of information between multiple entities engaged in a construction project. One or more aspects of the present disclosure may eliminate or reduce an amount of manual translation used by a builder and/or a vendor by enabling the builder and/or the vendor to configure a purchase order (PO) to include information that identifies a specific product to be delivered in connection with the PO. During configuration of the PO, the systems, methods, and computer-readable storage devices of the present disclosure may map product identification information to a format used by either the builder or the vendor, such that when the builder is viewing the product identification information, the information is presented in a format used by the builder, and when the vendor is viewing the product identification information, the information is presented in a format used by the vendor. The mapping of the information to a format native to the viewing party may eliminate or reduce the amount of manual translation used by the builder and/or the vendor, and may also reduce or eliminate incorrect bids, incorrect product deliveries, reduce costs, and increase productivity for the builders and the vendors.

In an additional aspect of the present disclosure, illustrative aspects of systems, methods, and computer-readable storage devices for coordinating information associated with the tracking of products used in the construction of a home are provided. The information may be used by a home builder to establish that the builder qualifies for one or more rebates offered by a manufacturer, and may also be used by a manufacturer to verify that the builder qualifies for the rebates. Additionally, the systems, methods, and computer-readable storage devices of the present disclosure may provide information to a manufacturer identifying end consumers that have purchased, either directly or indirectly, a product made by the manufacturer. This information may then be used by the manufacturer to more effectively determine marketing campaigns for advertising the product, and to contact end consumers (e.g., in the event of a product recall). The information provided to the manufacturers may also reduce the manufacturer's cost to track and verify rebate eligibility, enabling the manufacturer to provide larger rebates, increase the manufacturer's profits, increase the builder's profits, lower the cost of purchasing a new home, or a combination of these benefits.

The foregoing has outlined rather broadly the features and technical advantages of the present disclosure in order that the detailed description that follows may be better understood. Additional features and advantages will be described hereinafter which form the subject of the appended claims. It should be appreciated by those skilled in the art that the concepts and specific embodiments disclosed may be readily utilized as a basis for modifying or designing other systems, methods, processes, and computer-readable storage devices configured to carry out the same purposes as the present disclosure. It should also be realized by those skilled in the art that such equivalent constructions do not depart from the scope of the present disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the scope of the present disclosure.

BRIEF DESCRIPTION OF THE FIGURES

FIG. 3 is an illustrative aspect of a graphical user interface (GUI) for configuring a PO;

DETAILED DESCRIPTION

Figure 1:
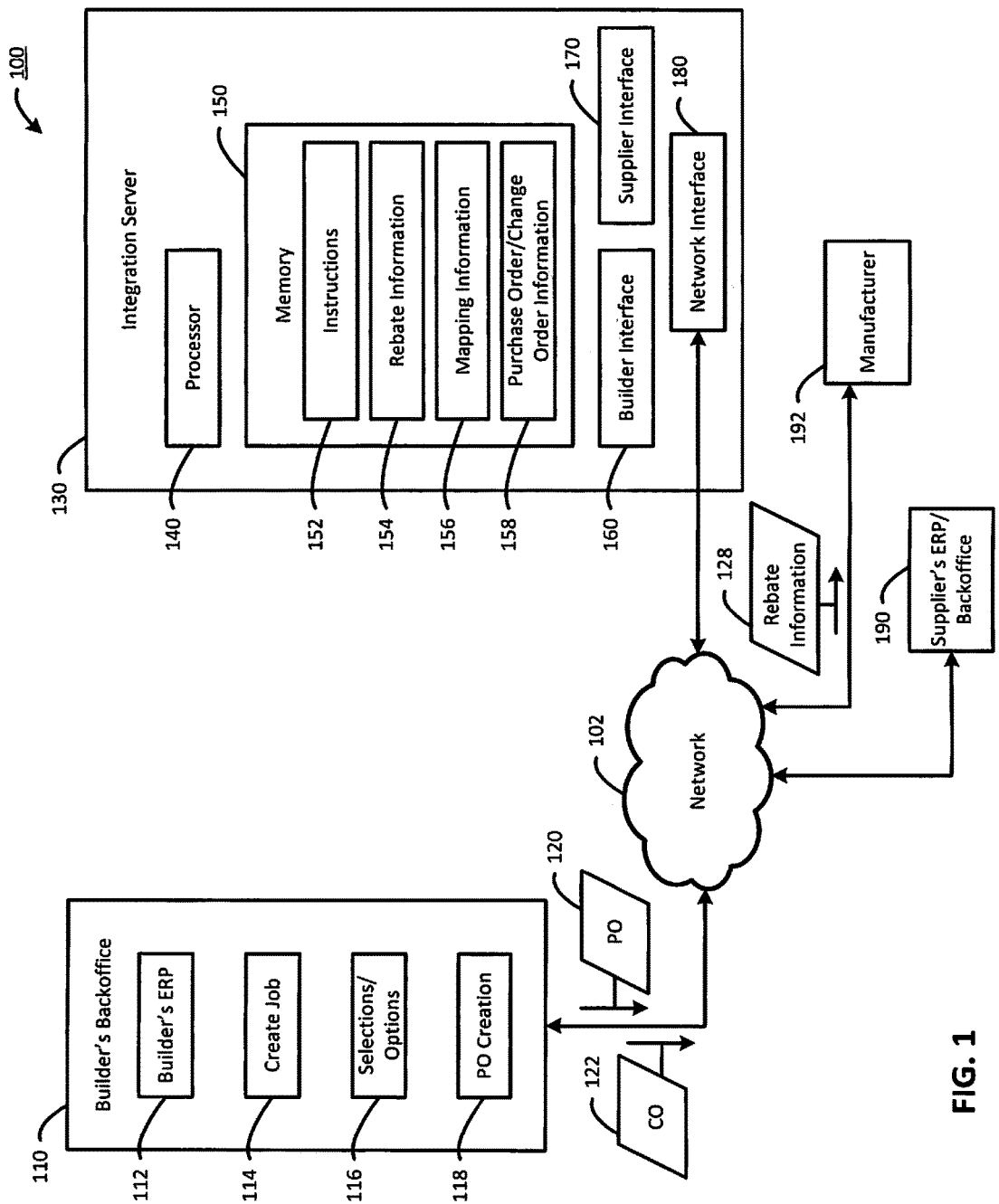
FIG. 1 shows illustrative aspects of a system including an integration server for coordinating information between a builder and one or more vendors or manufacturers.

Referring to FIG. 1, illustrative aspects of a system 100 including an integration server 130 for coordinating information between a builder and one or more vendors or manufacturers is shown. It is noted that, although the present disclosure describes aspects of the integration server 130 with respect to a construction project (e.g., building a home), the operations performed by the integration server 130 may provide benefits to other systems (e.g., distribution systems) and other industries (e.g., manufacturing of goods and sales). Further, although the present disclosure describes the integration server 130 as coordinating information between multiple different entities (e.g., a builder, manufacturer, supplier, etc.), the integration server 130 may also be used to coordinate information within a single entity (e.g., coordinating information between different divisions within a company).

As shown in FIG. 1, the system 100 includes the integration server 130. The integration server 130 includes a network interface 180 that may communicatively couple the integration server 130 to a builder's backoffice 110, to a supplier's backoffice 190, and to a manufacturer 192 via a network 102. The network 102 may include one or more wired networks, one or more wireless networks, or a combination of wired and wireless networks. The integration server 130 may communicate with the builder's backoffice 110, the supplier's backoffice 190, and/or the manufacturer 192 over the network 102 using one or more communications protocols (e.g., a TCP/IP protocol, an 802.11 wireless communication protocol, etc.). The integration server 130 also includes a processor 140 and a memory 150. The memory 150 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. As shown in FIG. 1, the memory 150 may store instructions 152. The instructions 152 may be executable by the processor 140 to perform operations according to one or more aspects of the present disclosure, as described with reference to FIGS. 1-11.

The builder's backoffice 110 may include a number of systems, such as a builder's enterprise resource planning (ERP) system 112, a job creation system 114, a selections and options system 116, and a purchase order (PO) creation system 118. The systems included in the builder's backoffice 110 may be used to perform various aspects of a construction project. For example, as explained above, the home builder may engage in one or more projects (e.g., building a single home or building multiple homes as part of a subdivision development) and may use a various number of outsourcing techniques to complete the one or more projects. The outsourcing techniques typically involve coordination of information among multiple vendors (e.g., materials suppliers, appliance suppliers, contractors or laborers, etc.). For example, the construction process may begin when an architect creates a design specification (e.g., a blueprint) for a home. The design specification for the home may identify a product (e.g., a light) and one or more characteristics of the product (e.g., the light is a 60 watt, 120 volt, 60 hertz light). There may be thousands of products that satisfy the one or more characteristics identified in the specification.

A designer may assist the builder in narrowing down the thousands of products to a particular category or set of products that the builder would like to make available for inclusion in the home. Using lighting as an example, the builder and the designer may identify a first set of light fixtures that may be offered for sale with a particular home and a second set of light fixtures that may also be offered for sale with the particular home. The first set of light fixtures may correspond to light fixtures that may be installed in a first area of the home (e.g., a foyer) and the second set of light fixtures may correspond to light fixtures that may be installed in a second area of the home (e.g., a bathroom). The first set of light fixtures may satisfy a first set of characteristics included in the design specification and the second set of light fixtures may satisfy a different set of characteristics included in the design specification.

After the design process is complete and the builder has identified the sets of products to be offered for sale with the particular home, the builder may send requests for bids to a plurality of vendors. The requests may identify the products selected during the design process, and may request that the vendors provide the builder with costs that the builder is to pay the vendors in exchange for the vendors providing (e.g., delivering and/or installing) the products in association with the project (e.g., construction of the home).

For example, the builder may send a first request to a first vendor (e.g., a first appliance retailer), and may send a second request to a second vendor (e.g., a second appliance retailer). The first request and the second request may identify kitchen appliances (e.g., dishwashers, ovens, ranges, microwaves, refrigerators). The builder may receive a first bid for the kitchen appliances from the first vendor and a second bid for the kitchen appliances from the second vendor. The first bid may indicate that the builder is to pay the first vendor a first amount in exchange for the first vendor providing (e.g., delivering and/or installing) the kitchen appliances, and the second bid may indicate that the builder is to pay the second vendor a second amount in exchange for the second vendor providing (e.g., delivering and/or installing) the kitchen appliances. The first amount and the second amount may be a same amount or different amounts.

The builder may enter the first amount into the builder's ERP system 112 as a first cost for the kitchen appliances, and may enter the second amount into the builder's ERP system 112 as a second cost for the kitchen appliances. Alternatively, the builder may select one of the vendors (e.g., a vendor who's bid indicates a lower cost to the builder), and may enter an amount indicated by a respective bid received from the selected vendor into the builder's ERP system 112.

When the builder enters the amounts indicated in each of the received bids into the builder's ERP system 112, the builder may generalize the information identifying the product(s) associated with the bids. For example, the builder may have received multiple bids indicating costs associated with providing (e.g., delivering and/or installing) carpet. A first bid for the carpet may indicate that the first vendor will supply three (3) types of carpet manufactured by a first manufacturer, and that the three (3) different types of carpet are each available in ten (10) different colors. The first bid may indicate costs that the first vendor will charge the builder for providing each of the three (3) different types of carpet (i.e., for providing each type of carpet in any of the ten (10) different colors). A second bid may indicate that the second first vendor will supply the three (3) types of carpet manufactured by the manufacturer, and that the three (3) different types of carpet are each available in ten (10) different colors. The second bid may indicate costs that the second vendor will charge the builder for providing each of the three (3) different types of carpet (i.e., for providing each type of carpet in any of the ten (10) different colors).

A first type of carpet of the three (3) different types of carpet may correspond to base carpet, a second type of carpet of the three (3) different types of carpet may correspond to a mid-level carpet, and a third type of carpet of the three (3) different types of carpet may correspond to luxury carpet. The costs associated with providing the base carpet may be less than the costs associated with providing the mid-level carpet and the luxury carpet, and the costs associated with providing the luxury carpet may be greater than providing the base carpet and the mid-level carpet. The builder may generalize the information included in the first bid for carpet and/or the second bid for carpet when entering the cost information into the builder's ERP system 112. For example, instead of creating thirty entries (e.g., three (3) different types of carpet times ten (10) different colors=thirty (30) total carpet options) in the builder's ERP system 112, the builder may create three (3) entries for carpet in the builder's ERP system 112 using the cost information included in the bid(s). A first entry in the builder's ERP system 112 may indicate a cost for base carpet, a second entry in the builder's ERP system 112 may indicate a cost for the mid-level carpet, and a third entry in the builder's ERP system 112 may indicate a cost for the luxury carpet. Thus, the information stored in the builder's ERP system 112 does not identify a particular carpet to be provided (e.g., which color of carpet is to be provided).

As another example of how information is generalized, consider the example above where the design specification for the home identified the product as a light and also identified the one or more characteristics of the product (e.g., the light is a 60 watt, 120 volt, 60 hertz light). The builder may receive a bid to provide the product (e.g., the light) having the one or more characteristics of the product (e.g., the light is a 60 watt, 120 volt, 60 hertz light). When the builder receives the bid and inputs the cost information into the builder's ERP system 112, the builder may omit the information that identifies the characteristics of the product, causing that information to be lost. For example, the information for the light, when stored in the builder's ERP system 112, may simply indicate "lighting" and the cost information from the bid without including the one or more characteristics. Thus, as information is input into the builder's ERP system 112, some information (e.g., cost information for the product) is gained while other information (e.g., the one or more characteristics of the product) is lost.

After all of the bids have been received, the builder has selected the vendors to be used in providing the products for the one or more projects, and the respective cost information has been input into the builder's ERP system 112, the products may be made available in a sales tool, such as the selections and options system 116. When a purchaser buys a home from the builder, the purchaser works with a sales representative of the builder to configure (e.g., select the products to be included in the home, etc.) the home using the selections and options system 116. Once the purchaser has configured the home, information specifying the configuration of the home may be stored as a job by the create jobs system 114.

The information stored by the create jobs system 114 may identify packages of products (e.g., base carpet, mid-level kitchen appliances, etc.) that the purchaser has selected for inclusion in the home. The builder may use the purchase order (PO) creation system 118 to generate POs, such as the PO 120, for various vendors (e.g., materials suppliers, contractors or laborers, appliance suppliers, etc.). A PO sent to a particular vendor may include information descriptive of products (e.g., materials, labor, appliances, etc.) that the particular vendor is to provide in association with the project (e.g., the construction of the home). However, the information included in the PO may be generated using the information stored in the builder's ERP system 112 which, as explained above, does not include the one or more characteristics of the product. For example, a PO sent to a carpet supplier may request delivery and/or installation of base carpet to the home on a particular date, and a PO sent to an appliance supplier may request delivery and/or installation of mid-level kitchen appliances to the home on a particular date. Thus, the information included in a particular PO may not enable the vendor to determine the exact product to be delivered (e.g., which color of base carpet, which specific light fixture or light bulb is to be used, the color of the kitchen appliances, a manufacturer of the kitchen appliances, etc.).

In an aspect, the POs may be sent from the PO creation system 118 to the integration server 130. For example, the PO creation system 118 may send the PO 120 to the integration server 130 via the network 102. The integration server 130 may receive the PO 120 at the network interface 180. The PO 120 received by the integration server 130 may not identify a specific product that a vendor is to provide (i.e., because the builder's ERP system 112 does not include entries for each available product). The integration server 130 may store the PO 120 in the memory 150 as an entry in the PO and change order (CO) information database 158.

The processor 140 may set a flag associated with an alert to indicate that the PO 120 has been received. In an aspect, the builder and/or one or more vendors may access information, such the information stored in the PO and CO information database 158, using an application running on a computing device of either the builder or the one or more vendors. The computing device may include a personal computer, a laptop, a tablet computing device, a personal digital assistant, a smartphone, or other electronic device that is capable of communicating with the integration server 130 via the network 102. In an alternative or additional aspect, the builder and/or the one or more vendors may access the information stored at the integration server 130 using a web browser (e.g., a browser-based web-application) configured to communicate with the integration server 130 via the network 102. In another aspect, the information stored at the integration server 130 may be accessible to the builder and/or the one or more vendors using both the application and the web browser. The application and/or the web browser may present one or more graphical user interfaces (GUIs) to a user (e.g., the builder, the vendor, or both) that enable the user to view, manipulate (e.g., add/modify/delete), or otherwise use the information stored at the memory 150.

In an aspect, the GUIs presented by the application and/or the web browser may use different skins for providing information to the builder and the vendors, respectively. For example, the application and/or the web browser presented to the builder may have a first skin (e.g., a first color scheme) and the application and/or the web browser presented to the vendor may have a second skin (e.g., a second color scheme). The first skin and the second skin may be different. In an aspect, although the skins of the application and/or the web browser may be different for the builder and the vendor, the presentation of content and arrangement of elements within the respective GUIs may be identical. Thus, if the vendor is discussing a particular PO with the builder, when the vendor references or describes elements or features of the GUI, the builder is viewing a GUI that includes the same elements or features arranged or configured in the same manner as the GUI presented to the vendor.

For example, if the vendor is viewing a PO presentation GUI that presents information associated with a first PO and the vendor is also viewing the PO presentation GUI that also presents information associated with the first PO, the GUIs presented to the vendor and the builder within the respective GUIs would be identical except for differences in the skins used by the respective GUIs. This may enable the vendor and builder to more easily communicate and/or direct each other's attention to information of interest.

In an aspect, the integration server 130 includes a builder interface 160 and a supplier interface 170. The builder interface 160 may be configured to communicate with the builder's backoffice 110 via the network 102 and/or provide the application and/or the web-browser with access to the information stored at the integration server 130. The supplier interface 160 may be configured to communicate with the supplier's backoffice 190 via the network 102 and/or provide the application and/or the web-browser with access to the information stored at the integration server 130. Illustrative aspects of the functions provided by the builder interface 160 and the supplier interface 170 are discussed further with reference to FIG. 7.

Figure 2:
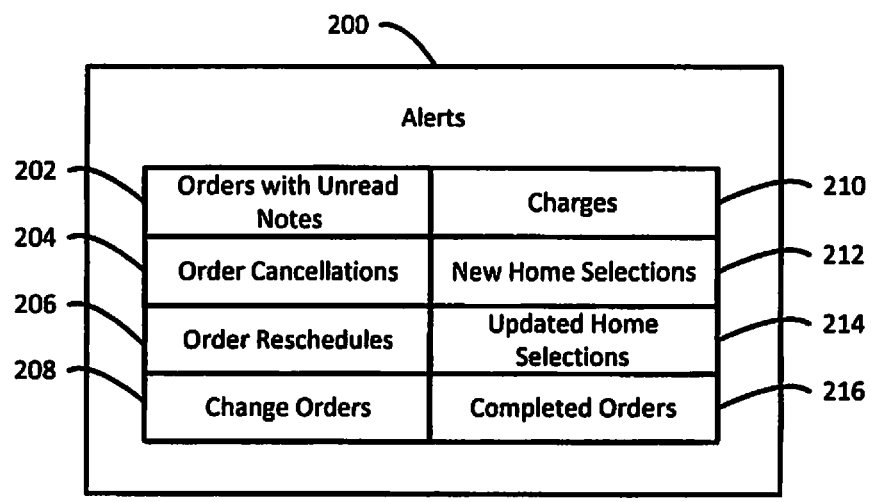
FIG. 2 is an illustrative aspect of a graphical user interface (GUI) for managing alert information.

In an aspect, the integration server 130 may generate one or more alerts in response to receiving information, such as the PO 120. In an aspect, the alerts may be presented to a user (e.g., either the builder or the vendor) via a particular GUI presented using the application and/or the web browser. For example, and referring to FIG. 2, an illustrative aspect of a graphical user interface (GUI) 200 for managing and presenting alert information is shown. As shown in FIG. 2, the GUI 200 includes a first selectable element 202, a second selectable element 204, a third selectable element 206, a fourth selectable element 208, a fifth selectable element 210, a sixth selectable element 212, a seventh selectable element 214, and an eighth selectable element 216. The first selectable element 202 may provide the builder with alerts indicating an order (e.g., a PO or a CO) includes notes that have not been read. An illustrative aspect of incorporating notes into an order is described further with reference to FIG. 3.

The second selectable element 204 may provide alerts indicating cancellation of an order. By providing alerts associated with canceled orders, the builder may more easily identify orders which have been canceled, determine a reason for the cancellation (e.g., based on notes included in the cancelled, order or in the cancellation alert), and take action if necessary in response to the order cancellation (i.e., place another order with a different vendor, etc.). In an aspect, the second selectable element 204 may only provide alert information associated with orders that have been canceled by the other party. For example, the builder may only receive order cancellation alerts when orders are cancelled by vendors, and the vendors may only receive order cancellation alerts when orders are cancelled by the builder. By only providing cancellation alerts indicating orders canceled by another party, the number of order cancellation alerts may be reduced. Additionally, because the party cancelling the order, whether the builder or the vendor, is presumably aware of the cancellation, the alerts may be more meaningful, since the only order cancellation alerts received are for orders that the receiving party would not otherwise be aware of.

In an aspect, orders may be cancelled by the builder or by the vendor. When an order is cancelled, the processor 140 may detect the cancellation and may generate an appropriate alert (i.e., an alert for the builder, an alert for the vendor, or both). The processor 140 may detect the order cancellation based on information included in the order. For example, a GUI displayed to enable the builder or the vendor to view the order may include a cancel order feature (e.g., button, a checkbox, a radio button, or some other control) to indicate that the party would like to cancel the order. In an aspect, activation of (e.g., selection of) the cancel order feature may prompt the user to input notes to indicate a reason for the cancellation of the order. By enabling the vendor to cancel an order, the builder may avoid unnecessary expenses (i.e., when the builder specified a wrong order or when the builder sent duplicative orders to the same vendor). By enabling the builder to cancel an order, the vendor may be notified of the cancellation and prevented from delivering products (e.g., materials, labor, etc.) to the build site when those products are not needed.

In another aspect, when an order is to be canceled, the builder and the vendor associated with the order may be required to confirm cancellation of the order prior to the order being canceled. For example, the vendor may receive an alert via the GUI 200 indicating cancellation of an order by the builder and the vendor may then confirm the cancellation. Confirming the cancellation may cause the integration server 130, or the processor 140 of the integration server 130, to generate an additional alert to the party that cancelled the order to indicate that the cancellation has been confirmed. The alert may be cleared when the party receiving the alert has viewed the alert. If the party receiving the cancelled order alert and the order with unread notes alert checks one of the alerts, both of the alerts may be cleared. For example, if the party views the cancelled order alert presented in connection with the second selectable element 204, the alert presented in connection with the first selectable element 202 may be cleared (i.e., because the cancelled order alert includes the notes indicating the reason that the order was cancelled). By requiring confirmation of cancelled orders, the vendor may avoid incorrect delivery of products (e.g., materials, labor, etc.) in association with a project. For example, if the builder sends duplicative orders, the vendor may cancel one of the orders and include notes indicating that the reason for the cancellation was a duplicative order. The notes may also identify the other order so as to provide the builder with the ability to confirm whether the order is in fact a duplicate order.

In addition to providing alerts indicating the cancellation of orders, an alert may generated and presented via the first selectable element 202 to indicate an order with unread notes (e.g., the notes included in the cancelled order). The builder may then confirm cancellation of the order, indicating to the vendor that the builder desires the vendor to only fulfill one of the orders. If the builder does not confirm cancellation of the order, the vendor may assume that the builder intended the second order to be filled by the vendor, and that the vendor will be paid by the builder for fulfilling both orders. Additionally, the builder may reject the order cancellation, explicitly indicating to the vendor that the builder desires the vendor to fulfill both orders. The builder may include notes in the rejection of the order cancellation to explain why the cancellation was rejected or to provide additional information to the vendor as to the reason for the duplicative orders. Although features associated confirming cancellation of orders have been described with reference to duplicative orders, the cancellation confirmation feature may be used in conjunction with a cancellation of a single order (e.g., because the vendor is unable to fulfill the order, etc.), and/or to provide other features and benefits.

The third selectable element 206 may provide alerts associated with orders that have been rescheduled. The order may have been rescheduled by the builder, the vendor, or both. By allowing the builder to reschedule orders, vendors may avoid delays in fulfilling orders. For example, products to be provided by a first vendor may be dependent upon a second vendor completing a task. The builder may reschedule a delivery date associated with an order sent to the first vendor when the builder determines the second vendor has not or will not complete the task prior to the date the first vendor is to provide the products. Additionally, by allowing the vendor to reschedule orders, the builder may be made aware of potential delays in fulfilling orders, reasons for the delay, etc. In an aspect, the third selectable element 206 may only provide order reschedule alerts to the builder when orders are rescheduled by a vendor. In an additional or alternative aspect, the third selectable element 206 may only provide order reschedule alerts to the vendor when orders are rescheduled by the builder.

In an aspect, rescheduling of orders may also require confirmation from one or both parties. For example, if the builder reschedules an order, the order may not be rescheduled until the vender associated with the order confirms the rescheduled delivery date. If the vendor requests to reschedule the order, the order may not be rescheduled until the builder confirms the rescheduled delivery date. The rescheduled order alerts may include notes indicating the reason that the order was rescheduled or requested to be rescheduled, enabling the party receiving the alert to be informed as to the reason for the rescheduling. When a rescheduled order includes notes, an alert may be presented in connection with both the first selectable element 202 and the third selectable element 206. By providing an alert in connection with the first selectable element 202 to indicate the reason for the rescheduling of the order and providing an alert in connection with the third selectable element 206 to indicate an order has been rescheduled, a likelihood that the party receiving the alert will become aware of the rescheduled order may be increased (i.e., because the party may be alerted to the rescheduling of the order by either of the alerts). The alert may be cleared when the party receiving the alerts has viewed one of the alerts. If the party receiving the rescheduled order alert and the order with unread notes alert checks one of the alerts, both of the alerts may be cleared. For example, if the party views the rescheduled order alert presented in connection with the third selectable element 206, the alert presented in connection with the first selectable element 202 may be cleared (i.e., because the rescheduled order alert includes the notes indicating the reason for the rescheduling of the order).

In an additional aspect, the alerts presented by the third selectable element 206 may be generated by the integration server 130 or the processor 140 of the integration server 140 automatically. For example, the processor 140 may periodically analyze the information stored in the PO and CO information database 158 to determine whether any dependencies between orders for different vendors exist. The dependencies may be determined based on criteria stored in the memory 150 of the integration server 130. For example, when constructing a home, a trim carpenter may be unable to deliver a product (e.g., crown molding) in connection with the construction of the home until after sheetrock has been delivered and installed at the home by a drywall vendor. The drywall vendor may receive a PO indicating a date to provide (e.g., deliver and/or install) the sheetrock in the home. Upon completion of the sheetrock installation, the sheetrock vendor may provide information to the integration server indicating that the providing of the sheetrock to the home is complete.

The integration server 130 may store information in the memory 150 indicating that the sheetrock installation is estimated to take three (3) days. If the integration server 130 (or the processor 140) determines that the requested delivery date for the trim carpenter to deliver the crown molding is within a threshold number of days (e.g., less than three (3) days) and no indication that the completion of the provisioning of the sheetrock has been received, the integration server 130 may provide a rescheduling alert to the builder via the GUI 200. The rescheduling alerts generated by the integration server 130 may be provided to the builder as suggestions or recommendations and the builder may then confirm the rescheduling of the order or reject the rescheduling of the order. When the builder confirms rescheduling of the order, an alert may be provided to the respective vendor associated with the rescheduled order to alert the respective vendor of the rescheduled delivery date. When the builder rejects the rescheduling of the order, an alert may not be provided to the respective vendor (i.e., in order to avoid confusion). The alert may be cleared when the party receiving the alert has viewed the alert. If the party receiving the rescheduled order alert and the order with unread notes alert checks one of the alerts, both of the alerts may be cleared. For example, if the party views the rescheduled order alert presented in connection with the third selectable element 206, the alert presented in connection with the first selectable element 202 may be cleared (i.e., because the rescheduled order alert includes the notes indicating the reason that the order was rescheduled). By predicting when orders may need to be rescheduled based on dependencies between orders and other information stored at the memory 150, the integration server 130 may enable a builder (or a vendor) more easily coordinate the many different parties involved in the completion of the project.

The fourth selectable element 208 may provide the builder with alerts associated with change orders (COs). A CO may indicate that a change has been made to a PO previously received by the integration server 130. For example, a home buyer may have originally selected mid-level carpet and a PO to a particular vendor requesting delivery of mid-level carpet may be received by the integration server 130. Subsequently, the home buyer may have changed their selection to luxury carpet, and the PO creation system 118 may have generated and sent a CO (e.g., the CO 122 of FIG. 1) indicating the change to the integration server 130. The fourth selectable element 208 may provide the particular vendor with an alert indicating that the CO has been received. In an aspect, the vendor or the builder may include notes indicating the reasons for the CO or other information. When the CO includes notes, an alert may also be presented in connection with the first selectable element 202. Illustrative aspects of information that may be presented in connection with an alert associated with a received CO are described with reference to FIG. 3.

The CO alert may be cleared when the party receiving the CO alert has viewed the alert. If the party receiving the CO alert and the order with unread notes alert checks one of the alerts, both of the alerts may be cleared. For example, if the party views the CO alert presented in connection with the fourth selectable element 208, the alert presented in connection with the first selectable element 202 may be cleared (i.e., because the CO alert includes the notes included in the CO). By providing alerts indicating receipt of a CO, the builder and/or the vendor associated with the CO may be made aware of changes to information included in a PO corresponding to the CO, such as when the particular CO indicates a change from mid-level carpet to luxury carpet.

The fifth selectable element 210 may provide alerts associated with various charges. For example, the charge alerts may identify information associated with pending back charges, completed back charges, cancelled back charges, other billing matters, etc.

The sixth selectable element 212 may provide alerts associated with new home selections (e.g., newly received POs) created for one or more construction projects. For example, when the integration server 130 receives the PO 120, the processor 140 may set an alert indicating a new home selection has been received. The new home selection may correspond to a product to be delivered by a particular vendor. The product to be delivered and the particular vendor that is to deliver the product may be identified in the PO. The alerts provided by the sixth selectable element 212 may notify the vendor associated with the PO.

As explained above with reference to the builder's ERP system 112, the PO may not identify a particular product that the vendor is to deliver. Rather, the PO may include an abstract description of the product to be delivered, such as base carpet or mid-level kitchen appliances. Such POs are referred to herein as non-configured POs because the PO does not enable the vendor to identify the specific product to be delivered on the delivery date included in the PO.

In an aspect, the sixth selectable element 212 may provide alerts only when a non-configured PO is received. By providing the alert via the sixth selectable element 212 only when a received PO is a non-configured PO, the builder may be provided with notice that the vendor who received the PO does not have enough information to determine the specific product to be provided based on the information included in the PO. Additionally, when the vendor receives an alert via the sixth selectable element 212, the vendor is able to automatically determine that additional information is required in order for the vendor to deliver the products requested in the PO. In an aspect, selection of the selectable element 212 may provide the builder and/or the vendor with an opportunity to configure the PO. The alert may be cleared when the party receiving the alert has viewed the alert. If the party receiving the new PO alert and the order with unread notes alert checks one of the alerts, both of the alerts may be cleared. For example, if the party views the new PO alert presented in connection with the sixth selectable element 212, the alert presented in connection with the first selectable element 202 may be cleared (i.e., because the new PO alert includes the notes included in the newly received PO). Illustrative aspects of information that may be presented in connection with an alert associated with a newly received PO, and with configuring the PO are described with reference to FIG. 3.

The seventh selectable element 214 may provide alerts associated with updated POs. For example, when the vendor receives an alert via sixth selectable element 212 and configures the PO corresponding to the alert, the builder may receive an alert via the seventh selectable element 214 that indicates the vendor has modified or updated the PO. Selection of the seventh selectable element 214 may provide the builder with an opportunity to review the changes made to the PO by the vendor. The builder may also be provided with an opportunity to confirm the changes made to the PO by the vendor or to modify the changes to the PO made by the vendor. When the builder confirms the changes to the PO, the vendor may receive information indicating that the vendor's changes to the PO are confirmed. Confirmation of the updated PO also provides the vendor with assurance that the specific products identified in the updated PO are correct.

When the builder changes the PO edited by the vendor, the vendor may receive an alert via the seventh selectable element 214. Illustrative examples of configuring, updating, and confirming a PO are described with reference to FIG. 3. In an aspect, the vendor or the builder may include notes indicating the reasons for the update to the PO. When the updated PO includes notes, an alert may also be presented in connection with the first selectable element 202. If the party receiving the updated PO alert and the order with unread notes alert checks one of the alerts, both of the alerts may be cleared. For example, if the party views the updated PO alert presented in connection with the seventh selectable element 214, the alert presented in connection with the first selectable element 202 may be cleared (i.e., because the update PO alert includes the notes indicating the updates made to the PO).

The eighth selectable element 216 may provide the builder and/or the vendor with information indicating completed orders. For example, when the vendor associated with the PO 120 completes provisioning of products requested in the PO 120, the vendor may provide and input to the integration server 130 indicating that the products have been provided. The integration server 130 may then generate an alert via the eighth selectable element 216 that indicates the completion of the delivery of products associated with the PO 120. By providing the builder with alerts indicating fulfillment of the order in association with POs, the eighth selectable element 216 may enable a builder to more easily determine a status of a project or a percentage of completion of the project. This may enable the builder to better determine whether the project is on schedule to be completed by a target completion date, which may impact the amount of money the buyer is to pay the builder in some instances. Additionally, the information indicating the completion of an order may be used to determine whether another order needs to be rescheduled, as described above with reference to the rescheduled order alerts.

In an aspect, selection of a particular selectable element of the selectable elements 202-216 may cause the GUI 200 to present additional GUIs other than those illustrated in FIG. 2. For example, selection of the sixth selectable element 212 may cause the processor 140 and/or respective ones of the builder interface 160 and the supplier interface 170 to present or otherwise provide the information associated with the GUI 300 of FIG. 3 via the application or web browser, the operations of which are described in detail below. As another example, selection of the particular selectable element may cause the GUI 200 to present a list of selectable items (e.g., a list of non-configured POs, a list of orders with unread notes, etc., not shown in FIG. 2) and selection of a particular selectable item from the list of selectable items may generate one or more additional menus or one or more additional GUIs. For example, selection of the sixth selectable element 212 may cause the processor 140 to and/or respective ones of the builder interface 160 and the supplier interface 170 to present or otherwise provide, within the GUI 200 or another GUI, a list of non-configured POs. Selection of a particular non-configured PO may initiate presentation of the GUI 300 of FIG. 3, the operations of which are described below.

Referring back to FIG. 1, in an aspect, the processor 140 may provide the information to the various GUIs used present information to the builder and to the vendor. In an aspect, the information may be stored in a central data store, such as the PO and CO information database 158. For example, in response to receiving the PO 120, the processor 140 may store information included in the PO 120 as an entry in the PO and CO information database 158. Additionally, in response to receiving the PO 120, the processor 140 may generate an alert, as described with reference to FIG. 2. When the builder or the vendor requests to view information included in the PO 120, the processor 140 and/or respective ones of the builder interface 160 and the supplier interface 170 may populate a GUI that enables the builder or the vendor to configure the PO 120, as described with reference to FIG. 3. In an additional or alternative aspect, the integration server 130 may maintain separate PO and CO information databases for builders and vendors. In this aspect, when information (e.g., a PO) is received from the builder, the information may be stored in an entry of a builder's PO and CO information database and an additional entry may be created in a PO and CO information database associated with a vendor that is to provide products in connection with the received PO. By storing entries in different databases, the processor 140 may be operable to compare corresponding entries stored in the respective databases to determine a difference between the entries. In an aspect, when the processor 140 determines that differences are present between the two entries, the processor 140 may generate an alert, such as the updated PO alert described with reference to FIG. 2. In an additional aspect, the processor 140 may use the differences between the entries to highlight or otherwise emphasize the modifications to a PO, as described with reference to FIG. 2.

In response to receiving the PO 120, the processor 140 may generate an alert that may be provided to a party of interest (e.g., a vendor) using a GUI (e.g., the GUI 200 of FIG. 2). Additionally, in response to receiving the PO 120, the processor 140 may determine whether the PO 120 is a non-configured PO. For example, the processor 140 may determine whether the PO 120 includes information identifying a specific product or a generic description of a product (e.g., base carpet). In an aspect, when the processor 140 determines that the PO 120 is a non-configured PO, the processor 140 may generate multiple alerts, including a first alert to the builder to indicate a new PO has been received and needs to be configured and a second alert to the vendor to indicate a new PO has been received. The alerts may be provided to the builder and the vendor via a GUI, such as the GUI 200 described with reference to FIG. 2.

When the PO 120 is the non-configured PO, a user (e.g., the builder or the vendor) may desire to configure the PO 120. Configuring the PO 120 may include providing information that is in addition to and/or replaces information included PO 120. To illustrate, and referring to FIG. 3, an illustrative aspect of a graphical user interface (GUI) 300 for configuring a PO is shown. It is noted that although the GUI 300 is described with reference to configuring a PO, the concepts described with reference to FIG. 3 may also be applied to configuration of a change order (CO), such as the CO 122 of FIG. 1. As shown in FIG. 3, the GUI 300 includes a plurality of information elements including a first information element 310, a second information element 320, and a third information element 330.

Each of the plurality of information elements may be associated with a particular cost-code (e.g., a builder specific identifier) that is associated with products and or services to be provided by the vendor in connection with one or more POs. For example, the first information element 310 may be associated with a first cost code "410-Venting-Rough," the second information element 320 may be associated with a second cost code "370-Electrical-Rough," and the third information element 340 may be associated with a third cost code "490-Appliances-Rough." The cost codes may provide a vendor with an indication of the types of products and/or services to be provided in connection with the PO. For example, the third cost code "490-Appliances-Rough" may indicate to the vendor that the PO is associated a request to provide delivery and/or installation of appliances.

In connection with the providing of the appliances, the PO may also request that the vendor provide products associated with the first code-code "410 Venting Rough" and the second cost-code "370 Electrical Rough." The first cost code may indicate to the vendor that the vendor is to provide products associated with providing ventilation for the appliances, which may include providing ventilation for a clothes dryer, providing ventilation for a range hood, and other products that may be require ventilation and are to be provided to the home by the vendor. The second cost-code may indicate to the vendor that the vendor is to provide products (e.g., electrical wiring, switches, etc.) in connection with providing electrical power the appliances. Thus, a single PO may request a plurality of products be provided by the vendor. In an aspect, the GUI 300 may identify the PO using a PO identifier, which may be presented within the GUI 300 as a PO identifier 302 "PO-ID". By including the PO identifier 302 in the GUI 300, the vendor may be able to reference the PO using the PO identifier 302 when communicating with the builder (e.g., using notes, when contacting the builder over the phone, etc.).

Each of the plurality of information elements 310, 320, 330 may be expanded or condensed using expansion controls presented within the GUI 300. For example, the first information element 310 includes a first expansion control 312, the second information element 320 includes a second expansion control 322, and the third information element includes a third expansion control 332. In FIG. 3, the third information element 330 is shown in the expanded form (indicated by the "−" symbol within the third expansion control 332) and the first information element 310 and the second information element 320 are shown in the condensed form (indicated by the "+" symbol within the first expansion control 312 and the second expansion control 322, respectively). In an aspect, when a user selects a particular expansion control associated with a particular information element, the particular information element will be expanded or condensed depending on a previous state (e.g., an expanded state or a condensed state) of the particular information element. Additionally, the symbol presented within the particular expansion control may change (e.g., from a "+" to a "−" when changing from the condensed state to the expanded state or from the "−" to a "+" when changing from the expanded state to the condensed state).

In an aspect, the GUI 300 may present status identifiers in association with each of the information elements 310, 320, 330. For example, the first information element 310 includes a first status identifier 314, the second information element 320 includes a second status identifier 324, and the third information element 330 includes a third status identifier 334. The status identifiers may indicate a status (e.g., completed, confirmed, configured, non-configured, etc.) of providing the products associated with each of the information elements 310, 320, 330. In an aspect, the status indicators 314, 324, 334 may indicate the status using colors (e.g., green for confirmed, white for non-configured, yellow for configured but not confirmed, blue for completed, red for canceled, etc.). In an alternative or additional aspect, the status indicators 314, 324, 334 may indicate the status using letter codes (e.g., NC for non-configured, CC for configured and confirmed, CMPLT for complete, etc.). Thus, the status indicators 314, 324, 334 may provide a quick reference for the builder and/or the vendor when determining whether the products associated with the PO have been provided.

In FIG. 3, the third information element 330 is shown in the expanded state, as indicated by the third expansion control 332, and includes rows of additional information including a first row 340, a second row 350, a third row 360, and a fourth row 370. In an aspect, when a PO (e.g., the PO 120 of FIG. 1) is received at an integration server (e.g., the integration server 130 of FIG. 1), a processor (e.g., the processor 140 of FIG. 1) may determine whether the PO is a configured PO or a non-configured PO based on information included in the received PO. The processor may determine that the PO is a non-configured PO when the PO includes information having a first level of detail and may determine that the PO is a configured PO when the PO includes information having a second level of detail. The first row 340 may be used to present the information included in the PO that is at the first level of detail.

For example, in FIG. 3, the first row 340 of additional information indicates the description of the product to be provided in connection with the received PO is "Appliances2," the quantity of the product to be provided in connection with the received PO is "1," and the total price for providing the product in connection with the received PO is "$2,500." The description of the product (e.g., "Appliances2") may correspond to a mid-level appliance package that was selected by a home buyer, the quantity (e.g., "1") may indicate that only a single mid-level appliance package is to be delivered, and the total price (e.g., "2,500") may correspond to the price that the vendor who is to receive the PO is to be paid for providing products (e.g., appliances) in association with the PO. As can be appreciated, the description "Appliances2" does not tell the vendor the color of the appliances to be provided, a manufacturer of the appliances to be provided, a model number of the appliances to be provided, or the types of appliances (e.g., dishwasher, refrigerator, stove, range, etc.) to be provided. Thus, when the vendor receives the PO, the vendor will need to determine which specific products are to be provided in connection with the PO prior to delivering the products.

In an aspect of the present disclosure, the integration server 130 enables the vendor (or the builder) to configure the PO (e.g., select the specific products to be provided in connection with the PO) and then notifies (e.g., via the GUI 200 of FIG. 2) the respective other party that the PO has been configured (e.g., via the updated PO alerts provided by the seventh selectable element 214 of FIG. 2). To illustrate, a user (e.g., either the vendor or the builder) may configure the PO using control commands, such as the control commands 390-394. The user may select a first control command 390 to add the second row 350 to the PO. As shown in FIG. 3, the second row 350 enables the user to provide more detailed information than the information included in the first row 340.

The user may enter information into the second row 350 in order to configure the PO. For example, the user may enter a stock keeping unit (SKU) number or identifier (e.g., a model number) to identify a specific product (e.g., a specific kitchen appliance) to be provided in connection with the PO. The SKU number may correspond to an identifier used by the user to identify the specific product. For example, the builder may identify the product using a first SKU number (e.g., 123) and the vendor may identify the product using a second SKU number (e.g., 321). The first SKU number may be a builder specific SKU number and the second SKU number may be a vendor specific SKU number. When the builder is configuring the PO, the builder may enter the first SKU number in the second column of the second row 350. When the vendor is configuring the PO, the vendor may enter the second SKU number in the second column of the second row 350. Thus, during the PO configuration process, the party configuring the PO is enabled to identify the product to be provided using identifiers (e.g., SKU numbers) that are known to the configuring party.

In an aspect, the integration server 130 may provide translation of the party specific identifiers (e.g., the party specific SKU numbers) when presenting information to the user. For example, assume that the vendor configured the second row 350 using the second SKU number (e.g., 321) and then selected an update command 394. In response to the update command 394, the integration server 130 would generate an alert for the builder indicating that a PO has been updated, as described with reference to FIG. 2. When the builder, using the GUI 200 of FIG. 2, accesses the updated PO, the second row 350 would show the first SKU number (e.g., 123). The integration server 130 may accomplish this by storing mapping information (e.g., the mapping information 156 of FIG. 1).

The mapping information may include information that identifies all products provided by each of one or more vendors. The mapping information may include the SKU number used by each of the vendors to identify each of the products. The SKU numbers may include vendor specific SKU numbers, although some vendors may use SKU numbers that are not unique to a single vendor. The mapping information may also include mapping information that associates the products included in the mapping information to SKU numbers used by the builder to identify the products. Thus, although the vendor input the second SKU number into the second row 350, the integration server 130 may translate the second SKU number to the first SKU number when presenting the updated PO to the builder. It is noted that the mapping information (e.g., the mapping information 156) may include mapping information for multiple builders, each of the multiple builders may have a unique mapping of builder specific identifiers (e.g., builder specific SKU numbers) to vendor specific identifiers (e.g., vendor specific SKU numbers). Additionally or alternatively, some mappings may not be unique. For example, some builders may use a same SKU number for one or more products and mappings for these builders with respect to vendors that provide the one or more products may be the same. As another example, some builders may not use particular vendors. Thus, those builders may have a different mapping than other builders that use the particular vendors.

In an aspect, the mapping information may identify a plurality of products available from one or more vendors. However, a builder may only use a subset of the plurality of products (i.e., less than all of the plurality of products). The mapping information may retain information associated with products not included in the subset of products used by the builder. By storing information for all of the products provided by the vendors within the mapping information, updating the mapping information may be easier, such as when the builder decides to offer a new product. In this scenario the mapping information only needs to be updated to include the mapping of the builder's desired SKU number to the product, rather than having to add the product information and the SKU number(s).

In an aspect, the mapping information may also include information that maps the products to a category. For example, products such as dishwashers, ovens, stoves, etc. may be mapped to a category "Kitchen" or "Kitchen Appliances" while products such as washing machines and dryers may be mapped to a category of "Home and Laundry." By mapping the products to categories, a user who is configuring a PO or a CO may more easily identify the specific product. To illustrate, when the location associated with the second row 350 is "Kitchen", a search for products associated with the category of "Kitchen" may be initiated by in response to the user's selection of a search icon (e.g., the magnifying glass icon in the second column of the second row 350). Selection of the search icon may generate a popup GUI (not shown in FIG. 3) that provides a listing of all products provided by the vendor that are associated with the category of "Kitchen." Selection of a particular product included in the listing of products in the popup GUI may populate the second row 350 with information relevant to the selected product (e.g., a SKU number for the product, a description of the product, and other information, such as a model number, depending on a particular configuration of the GUI 300). Thus, the mapping information, when used in conjunction with the GUI 300, may enable the user to more easily identify specific products that are relevant to the desired configuration of the PO.

In an additional or alternative aspect, the integration server 130 may filter the results shown in the popup GUI based on whether the builder (e.g., the creator of the PO) uses the product. For example, the mapping information may include thousands of products within the "Kitchen" category that may be available from vendors, but the builder may only be offering a subset of the thousands of products in its homes. When the user enters the category "Kitchen" in the location column of the second row 350 and then selects the search icon, the popup GUI may only identify the subset of the products that the builder offers for sale in connection with the builder's homes. This may reduce the amount of time required to configure the PO and may also reduce a likelihood that an incorrect product is delivered (i.e., a product that the builder does not use in connection with its homes).

In an additional or alternative aspect, the integration server 130 may further filter the results based on the particular vendor that is to receive the PO or the CO. For example, when the builder is configuring the PO or the CO, the results may be filtered to only identify products within the category associated with the location indicated in the third column of the second row 350 that are provided by the particular vendor. This may reduce the amount of time required to configure the PO or the CO and may also reduce a likelihood that an incorrect product is specified in the PO or the CO (i.e., a product that the vendor does not provide or identification of the product using an identifier for a different vendor).

In yet another additional or alternative aspect, the mapping information may include information that further maps the products to sub-categories. The sub-categories may correspond to specific groups of products within a particular category of products. To illustrate, as described above, the builder may offer home buyers a choice of three (3) different packages of kitchen appliances. Each of the kitchen appliance packages may include a set of appliances that differ in some way (e.g., color, number of appliances included, manufacturer, etc.). The mapping information may further map products within the "Kitchen" category to each of the different packages. Thus, when a user is configuring the PO using the GUI 300 and selects the search icon (e.g., the magnifying glass icon), the popup GUI may be populated with only appliances that are included in the kitchen appliance package selected by the home buyer (e.g., as indicated in the description "Appliances2"). Additional aspects and advantages of using the mapping information (e.g., the mapping information 156 of FIG. 1) are described with reference to FIGS. 4-6.

The user may specify the category of products using the fourth column of the second row 350, shown in FIG. 3 as a dropdown menu. For example, the user may select the dropdown menu and a selectable list of various locations within a home (e.g., kitchen, dining, master bedroom, game room, etc.) may be presented. The user may select a desired location and the fourth column of the second row 350 may be updated to indicate the selected location. Alternatively or additionally, the user may specify the location by typing the location into the text box of the fourth column of the second row 350. The search results generated in response to selection of the search icon may be determined based on in part the specified location, as described above.

Information describing a product (e.g., a product selected from the popup GUI) may be populated within the description field in the third column of the second row 350 and a quantity of the selected product may be entered in the fifth column of the second row 350. In an aspect, the integration server 130 may prepopulate the quantity field based on a predicted quantity value. For example, most homes include a single dishwasher. If the selected product is a dishwasher, the integration server 130 may automatically populate the quantity field to one (1). If the quantity value is prepopulated by the integration server 130, the user may modify the value by simply entering a different value. The sixth column of the second row 350 may be used to enter notes into the PO or the CO. The notes may be used to indicate a reason why a particular product was selected or a particular row of additional information was added to the PO.

For example, the builder may configure the PO to include the second row 350, as shown in FIG. 3. The vendor, upon receiving an updated PO alert, a new PO alert, or both, as described with reference to FIG. 3, may view the PO and determine that additional configuration is required. For example, the vendor may use the add row command 390 to add the third row 360 and the fourth row 370 to the PO. The third row 360 may include information associated with installation of the appliance(s) indicated in the second row 350. The vendor may include notes in the third row 360 indicating that the builder forgot to include installation in the PO. Additionally, the fourth row 370 may include information identifying parts and accessories to be provided by the vendor in connection with the PO. For example, the home buyer may have selected a luxury package of kitchen appliances that includes a range with a removable grill top. The fourth row 370 may be used by the vendor to indicate that the removable grill is to be provided in connection with the PO. An aspect provided by enabling the vendor to update or configure the PO includes the sixth column of the respective rows 350-370, which is used to indicate a price the builder is to pay the vendor for each of the items included in the respective rows 350-370. As can be appreciated, by enabling the vendor to configure the PO using the GUI 300, the vendor is able to ensure that all of the items required for the vendor to receive proper payment for providing the products in connection with the PO are included.

In an aspect, when the builder or the vendor configures or modifies the PO and selects the update command 394, the integration server 130 may store information indicating the changes made to the PO. When the PO is subsequently viewed by the other party, the changes may be highlighted or otherwise made apparent to the other party. For example, when the vendor updates the PO to include the third row 360 and the fourth row 370 and selects the update command 394, the integration server 130 may store information indicating that the third row 360 and the fourth row 370 have been added to the PO. When the builder subsequently views the PO in response to an alert, the integration server 130 may outline the third row 360 and the fourth row 370 in a particular color (e.g., yellow). Alternatively or additionally, the integration server may change a font type of the information included in the third row 360 and the fourth row 370, such as to make the information appear in bold text. As the POs are configured, the integration server may update the status identifier associated with each of the POs. For example, as the PO identified by the PO identifier 302 is configured, updated, confirmed, etc., the integration server may update the status identifiers 314, 324, 334. It is appreciated that other methods may be used to highlight or otherwise make the updated information more apparent to the viewer, and that the examples above are included for purposes of illustration, rather than limitation.

When the builder views the PO as configured by the vendor, the builder may reject some or all of the changes by selecting a delete icon, shown in FIG. 3 in the last column of each of the respective rows 350, 360, 370. If the builder is satisfied with the changes made to the PO by the vendor, the builder can confirm the changes and the PO configuration by selecting the confirm command 392. It is noted that when the vendor views a PO configured by the builder, the vendor may also reject changes using the delete icon(s). In response to detecting that the confirm command 392 has been selected, the integration server 130 may generate an alert (e.g., an updated PO alert) that may be presented to the vendor via the GUI 200 of FIG. 2. The vendor may view the updated PO in response to the alert and determine that the PO configuration has been confirmed by the builder. For example, the integration server 130 may add information to the PO to indicate the confirmation of the PO configuration by the builder. Alternatively or additionally, the confirmation of the PO configuration may be indicated by an alert indicating a new confirmed PO has been received. The alert indicating the new confirmed PO may be provided within the GUI 200 or another GUI. Additionally, the PO status may be indicated when viewing the alerts using the GUI 200 of FIG. 2 or other GUIs (e.g., a pop-up GUI generated in response to interaction with the GUI 200 of FIG. 2). For example, alerts associated with confirmed POs or COs may be presented in a first color (e.g., green), alerts associated with non-configured POs or COs may be presented in second color (e.g., red), and alerts associated with updated or modified POs or COs may be presented in a third color (e.g., yellow). Highlighting the different types of alerts may provide a quick reference that indicates a status of the PO alert or the CO alert to the user viewing more quickly. It is noted that other methods of indicating the status of a PO or a CO may be provided, and that the examples above are included for purposes of illustration, rather than limitation.

By providing confirmation of the PO configuration, the vendor may be confident that he is delivering the correct product(s) to the home. Additionally, by enabling both the builder and the vendor to make changes to the PO, information may be more easily communicated between the parties. Further, by using the mapping information to facilitate product selections, the vendor is alleviated of the burden of manually mapping builder SKU numbers to vendor SKU numbers and the builder is alleviated of the burden of manually mapping vendor SKU numbers to builder SKU numbers, thus reducing an amount of time performing data conversion by hand, as is done presently by many builders and vendors. Additionally, the mapping information may reduce a number of incorrectly configured POs by mapping the products to categories and sub-categories and also by enabling filtering of products to those used by the builder when configuring the PO.

Referring back to FIG. 1, as the vendor provides the products in connection with the PO, the integration server 130 may generate rebate information 154 that may be stored at the memory 150. The rebate information 154 may identify each of the products provided on behalf of the builder by each vendor associated with construction of a home. Periodically, the builder may generate reports based on the rebate information 154, such as a rebate information report 128. The rebate information report 128 may provide information to the manufacturer 192 that identifies the products manufactured by the manufacturer 192 and that were used, purchased, installed, etc. by the builder in connection with one or more construction projects. In an aspect, the products identified in the rebate information report 128 may correspond to products for which the manufacturer 192 has offered a rebate. The rebates may be offered on a per unit basis (e.g., one rebate per product used by the builder), on a threshold number of units (e.g., one rebate for each home that the builder installed a threshold quantity of the product in), or based on some other criteria.

Because the specific products provided by the vendor are identified, as described with reference to FIG. 3, the rebate information 154 may enable the manufacturer 192 to more accurately determine the number of rebates that the builder is entitled to. Additionally, the rebate information 154 may enable the builder to more accurately identify rebates for which the builder has qualified for and to redeem such rebates. In an aspect, the manufacturer 192 may update the rebate information 154 to include information that specifies rebate qualification criteria for one or more products. The builder may then generate a list of available rebates based on the rebate qualification criteria provided by the manufacturer 192. By enabling the manufacturer 192 to provide the rebate qualification criteria to the integration server 130, the builder may more easily identify available rebates and generate reports indicating the number of rebates that the builder is entitled to.

Additionally, by providing more accurate rebate information reports, such as the rebate information report 128, the manufacturer may be made aware of end consumers that are using the products made by the manufacturer 192. For example, the rebate information report 128 may identify the address of each home that includes one or more products of the manufacturer 192. In an aspect, the one or more products may include products for which rebates are offered. In an additional or alternative aspect, the one or more products may include all products provided in connection with the home that were manufactured by the manufacturer 192, including products for which rebates were not offered. This information may enable the manufacturer 192 to contact end consumers, such as when product recalls are to be issued, or for marketing purposes.

The flow of communications between the builder's backoffice 110, the integration server 130, and the supplier's backoffice 190 may form a closed network for communicating detailed PO and CO information. The closed network is formed by the feedback (e.g., alerts, notes, etc.) provided when a party (e.g., either the builder or a vendor) modifies (e.g., updates, configures, reschedules, or otherwise changes) a PO or a CO. The feedback indicating changes made by a first party may be available for viewing by the other party instantaneously or nearly instantaneously, which may decrease delays introduced by currently available systems. Additionally, the closed network provides more opportunities to verify that the information included in the PO is correct, which may decrease a likelihood of an order being filled incorrectly. This may reduce costs for the vendor, the builder, or both and may decrease an amount of time required to complete construction of the home. It is noted that, although many of the aspects of the present disclosure have been described with reference to configuration of a PO, the aspects described herein may also be used in other aspects of the construction process, such as using the mapping information to generate and/or process bid requests and received bids, configuration of COs, and other aspects that may be appreciated by one or ordinary skill. Further benefits and features of a closed network system, such as the system 100 of FIG. 1, for communicating detailed PO information may be found in the description of FIGS. 4-11.

Figures 4, 5:
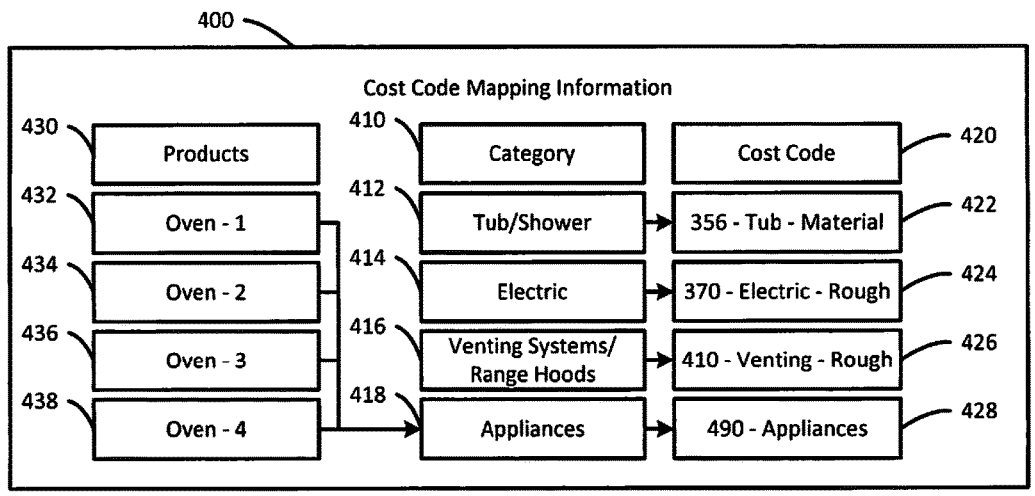
FIG. 4 is a first illustrative aspect of mapping information for use in configuring a purchase order (PO)
FIG. 5 is a second illustrative aspect of mapping information.

Referring to FIG. 4, a first illustrative aspect of mapping information 400 for use in configuring a purchase order (PO) is shown. As shown in FIG. 4, the mapping information 400 includes information associated with a plurality of product categories 410 including a tub/shower category 412, an electric category 414, a venting systems/range hoods category 416, and an appliances category 418. Each of the plurality of categories 410 may be mapped to one of a plurality of cost-codes 420. For example, the tub/shower category 412 may be mapped to a first cost code 422 "356-Tub-Material," the electric category 414 may be mapped to a second cost code 424 "370-Electric-Rough," the venting systems/range hoods category 416 may be mapped to a third cost code 426 "410-Venting-Rough," and the appliances category 418 may be mapped to a fourth cost code 428 "490-Appliances." The cost-codes may correspond to identifiers used by a builder's ERP system (e.g., the builder's ERP system 112 of FIG. 1) to identify particular aspects of the construction of a home. For example, the fourth cost-code 428 may correspond to a particular package of appliances (e.g., mid-level package appliances) while the second cost-code 424 may correspond to "roughing in"

electrical wiring of the home prior to installing the drywall in the home. As can be appreciated, the cost-codes 420, while providing some information about a particular aspect of the construction of the home, do not include or convey enough information to enable a vendor to identify the exact product to be provided.

In an aspect, the mapping information 400 may associate specific products with each of the categories 410. For example, in FIG. 4, a first product 432 (e.g., a first oven), a second product 434 (e.g., a second oven), a third product 436 (e.g., a third oven), and a fourth product 438 (e.g., a fourth oven) are associated with the appliances category 418. As described with reference to FIG. 3, in an aspect, the mapping information 400 may further map each category 410 to one or more sub-categories and then map each of the products 430 to a particular sub-category. For example, although not illustrated in FIG. 4, the mapping information 400 may map the appliances category 418 to a first sub-category associated with kitchen appliances and a second category associated with laundry room appliances (e.g., washing machine, dryer, etc.). The products 432-438 may be mapped to both the appliances category 418 and the kitchen appliances sub-category. Thus, when a user is searching for kitchen appliances when attempting to configure a PO, the products 432-438 may be presented within the popup GUI, as described with reference to FIG. 3.

Referring to FIG. 5, a second illustrative aspect of mapping information 500 is shown. As shown in FIG. 5, the mapping information 500 includes a plurality of product mapping identifiers 510 that provide mapping information for a plurality of builder product identifiers 520, mapping information for a plurality of supplier product identifiers 530, other third party identifiers 540, and manufacturer product identifiers 550. The other third party identifiers 540 may correspond to product identifiers used by wholesalers, retailers, and other entities as described further with reference to FIG. 6. Additionally, each of the product mapping identifiers 510 may correspond to a particular product (e.g., one of the products 430 of FIG. 4).

A first product mapping identifier 560 may be used to track the movement of one or more products through a supply chain irrespective of the different identifiers used by the builder, the vendors, the other third parties, and the manufacturer. For example, the mapping information 500 includes a first entry 560, a second entry 570, a third entry 580, and a fourth entry 590. The first entry 560 may include a first product mapping identifier (MAP-ID-Product1) associated with a first product, and may map a builder's identifier (B-ID-Product1) for the first product to the supplier's identifier (S-ID-Product1) for the first product and to other third party identifiers for the first product (not shown in FIG. 5) and to the manufacturer's identifier (M-ID-Product1) for the first product. The second entry 570 may be associated with a second product mapping identifier (MAP-ID-Product2) associated with a second product, and may map the builder's identifier (B-ID-Product2) for the second product to the supplier's identifier (S-ID-Product2) for the second product and to other third party identifiers for the second product (not shown in FIG. 5) and to the manufacturer's identifier (M-ID-Product2) for the second product. The third entry 580 may be associated with a third product mapping identifier (MAP-ID-Product3) associated with a third product, and may map the builder's identifier (B-ID-Product3) for the third product to the supplier's identifier (S-ID-Product3) for the third product and to other third party identifiers for the second product (not shown in FIG. 5) and to the manufacturer's identifier (M-ID-Product3) for the third product. The fourth entry 590 may be associated with a fourth product mapping identifier (MAP-ID-Product4) associated with a fourth product, and may map the builder's identifier (B-ID-Product4) for the fourth product to the supplier's identifier (S-ID-Product4) for the fourth product and to other third party identifiers for the fourth product (not shown in FIG. 5) and to the manufacturer's identifier (M-ID-Product4) for the fourth product. Using the mapping information 500, the integration server 130 of FIG. 1 may be configured to track the flow of products (e.g., the first product, the second product, the third product, and the fourth product) from the manufacturer to a third party, such as a wholesaler or distributor, to a supplier (e.g., a retailer, a contractor, etc.), and then to the builder despite each of the parties involved in the supply chain using a unique party specific identifier to identify the product. In an aspect, the mapping information 400 may include or be used in conjunction with the mapping information 500.

The integration server 130 may further be configured to generate rebate information (e.g., the rebate information 152 of FIG. 1 and/or the rebate information report 128 of FIG. 1) that may be provided to a manufacturer in connection with one or more rebates offered by the manufacturer. For example, the integration server 130 may store information associated with one or more rebates offered by a manufacturer. Periodically, or at the request of a user, the integration server 130 may generated rebate information associated with one or more rebates that the builder is eligible to receive. The rebate information may be determined by and may identify products made by the manufacturer that were purchased and/or used by the builder or provided to a project associated with the builder by one or more vendors. Based on the rebate information received the builder, the manufacturer may be able to accurately determine an amount of rebates and/or rebate dollars the builder qualifies for. Additionally, the rebate information may provide the manufacturer with information associated with the ending location of the products manufactured by the manufacturer.

For example, an appliance manufacturer may offer a rebate for a particular appliance, and builders that install that particular appliance in a home may generate rebate information indicating that builder installed the particular appliance at the home built at a particular address. The manufacturer may then provide the appropriate rebate(s) to the builder based on the rebate information. In an additional aspect, manufacturer may retrieve the rebate information to track the movement of the products through the supply chain, as described with reference to FIG. 6. Additionally, because the rebate information may indicate an address of a home where a product made by the manufacturer was installed, the manufacturer may more readily identify where to send notifications related to the particular product. For example, if a recall is issued for the particular product, the manufacturer is able to determine where to send a notification about the product recall using the rebate information. Additionally, because the rebate information indicates the address, the manufacturer is able to more accurately determine end consumer demand for its products in various locations. Additional illustrative aspects of tracking products using mapping information and rebate information are described with reference to FIG. 6.

Figure 6:
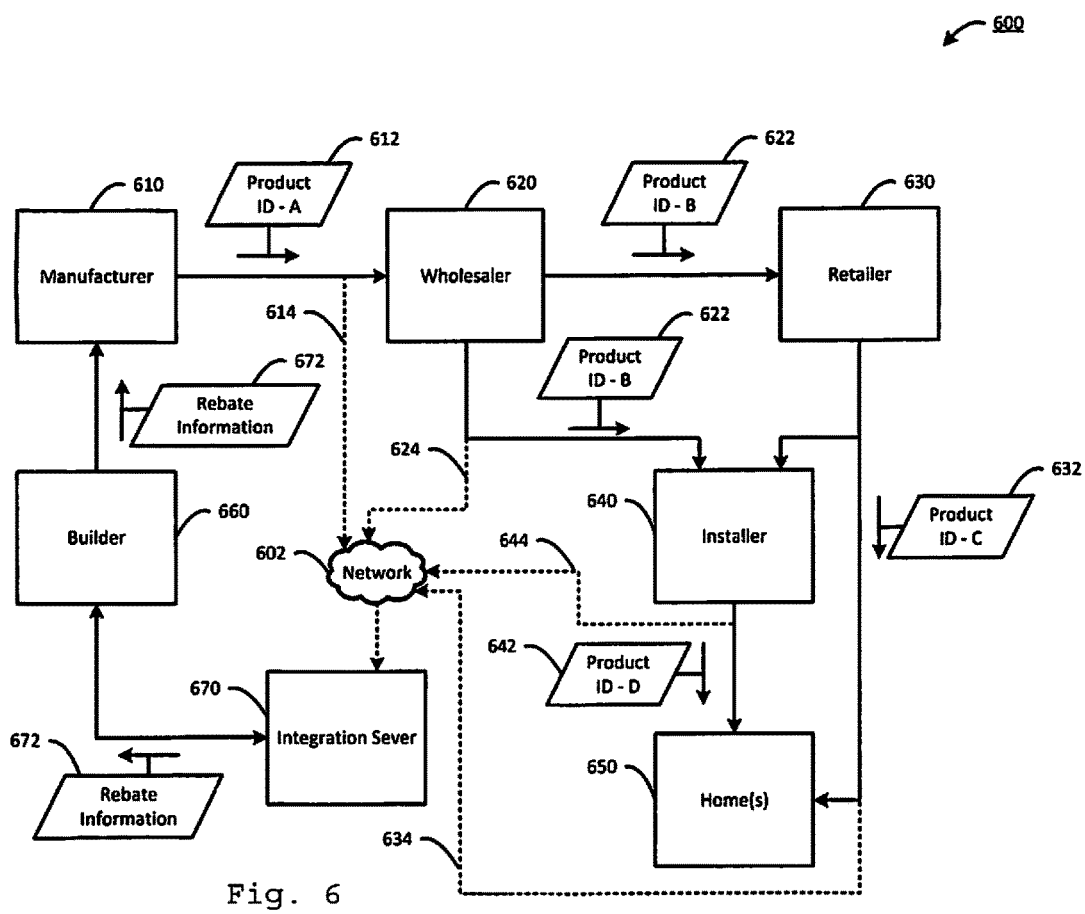
FIG. 6 is an illustrative aspect of a system for tracking distribution of a product through a supply chain.

Referring to FIG. 6, an illustrative aspect of a system 600 for tracking distribution of a product through a supply chain is shown. As shown in FIG. 6, participants in the supply chain include a manufacturer 610, a wholesaler 620, a retailer 630, an installer 640 (e.g., a contractor), and a builder 660. The system 600 includes an integration server 670 that may be communicatively coupled to each of the participants in the supply chain via a network 602. In an aspect, the integration server 670 may be the integration server 130 of FIG. 1 and may provide one or more of the features described with respect to FIGS. 1-5 and FIGS. 7-11.

The manufacturer 610 may manufacture a first product and may identify the first product using a first product identifier 612 (e.g., Product ID-A). The manufacturer 610 may sell the first product to the wholesaler 620. In an aspect, the manufacturer 160 may store information, indicated by the arrow 614, at the integration server 670 indicating the sale (e.g., the first product identifier, the quantity of the first product sold, where the first product was shipped, the wholesaler who purchased the first product, etc., or a combination of these pieces of information). In an aspect, the information may be stored as part of the rebate information 152 of FIG. 1. In an additional or alternative aspect, the information may be stored at the integration server 670 in a database specific to the manufacturer 610.

The wholesaler 620 may then distribute the first product to the retailer 630 and/or directly to the installer 640. As shown in FIG. 6, when the wholesaler 620 distributes the first product to the retailer 630 and/or to the installer 640, the wholesaler 620 may use a second product identifier 622 (e.g., Product ID-B) to identify the first product. In an aspect, the wholesaler 620 may store information, indicated by the arrow 624, at the integration server 670 indicating the sale (e.g., the second product identifier 622, the quantity of the first product sold, where the first product was shipped, who purchased the first product, etc., or a combination of these pieces of information). In an aspect, the information may be stored as part of the rebate information 152 of FIG. 1. In an additional or alternative aspect, the information may be stored at the integration server 670 in a database specific to the wholesaler 620.

The retailer 630 may then distribute the first product to the installer 640 or may deliver the first product directly to a home site 650 at the request of the builder 660. As shown in FIG. 6, when the retailer 630 distributes the first product to the installer 640 and/or to the home site 650, the retailer 630 may use a third product identifier 632 (e.g., Product ID-C) to identify the first product. In an aspect, the retailer 630 may store information, indicated by the arrow 634, at the integration server 670 indicating the sale (e.g., the third product identifier 632, the quantity of the first product sold, where the first product was shipped, the who purchased the product, etc., or a combination of these pieces of information). In an aspect, the information may be stored as part of the rebate information 154 of FIG. 1. In an additional or alternative aspect, the information may be stored at the integration server 670 in a database specific to the retailer 630.

The installer 640 may receive the first product from either the wholesaler 620 or the retailer 630, and may deliver the first product to the home site 650 at the request of the builder 660. As shown in FIG. 6, when the installer 640 receives the first product from the wholesaler 620, the first product may be identified using the second product identifier 622 (e.g., Product ID-B), and when the installer 640 receives the first product form the retailer 630, the first product may be identified using the third product identifier 632 (e.g., Product ID-C). When the installer 640 provides the first product to the home site 650, the installer 640 may use a fourth product identifier 642 (e.g., Product ID-D) to identify the first product. In an aspect, the installer 640 may store information, indicated by the arrow 644, at the integration server 670 indicating the sale (e.g., the third product identifier 642, the quantity of the first product sold, where the first product was shipped, who purchased the product, etc., or a combination of these pieces of information). In an aspect, the installer 640 may provide the information to the integration server 670 as described with reference to FIGS. 1-3 (e.g., using the GUI 200 of FIG. 2 and the GUI 300 of FIG. 3). In an aspect, the information may be stored as part of the rebate information 152 of FIG. 1. In an additional or alternative aspect, the information may be stored at the integration server 670 in a database specific to the installer 640.

The builder 660 may access the information stored at the integration server 670 to generate a rebate information report 672. The rebate information report 672 may identify one or more rebates that the builder 660 is eligible to receive from the manufacturer 610 for installing the first product at the home site 650. Because the integration server 670 is configured to receive and store information associated with the distribution of the first product through the supply chain, the integration server 670 may also be configured to generate reports on behalf of the manufacturer 610 that enable the manufacturer 610 to verify the rebate information report 672 received from the builder 660.

If the builder 660 submits the rebate information report 672 claiming the builder is eligible for a first number of rebates, the manufacturer 610 may generate a report that provides information establishing that the builder 660 satisfies the criteria required to be eligible for the first number of rebates. For example, if the builder 660 is eligible for one (1) rebate for every instance where the builder 660 installed the first product at the home site 650, the manufacturer may generate a report to verify that the installer 640 and/or the retailer 630 provided (e.g., delivered and/or installed) to the home site 650. In an aspect, the rebate information reports, whether generated by the builder 660, the manufacturer 610, or another party to the supply chain, may be generated using mapping information (e.g., the mapping information 400 of FIG. 4 and/or the mapping information 500 of FIG. 5). The mapping information may be used to track the distribution of the first product from the manufacturer 610 to an end consumer associated with the home site 650. Thus, despite each of the parties in the supply chain using different identifiers for the first product, the integration server 670 enables identification of end consumers of the first product, how the products travels through the supply chain, and where the end consumers of the first product are located. Additionally, despite each of the parties in the supply chain using different identifiers for the first product, the integration server 670 provides a fast way to verify rebate eligibility and rebate information tracking for manufacturers, builders, and other parties in the supply chain.

In an aspect, the rebate information report may be generated based at least in part on completed orders. For example, a vendor may receive an order (e.g., the PO 120 of FIG. 1 or the CO 122 of FIG. 1) requesting that the vendor (e.g., the retailer 630 or the installer 640) provide the first product to the home site 650. Alerts may be generated and the order may be configured, as described with reference to FIGS. 2 and 3. Upon fulfilling the order, the vendor may provide information (e.g., by updating the order, etc.) to indicate that the order has been fulfilled. Because the order has been configured (i.e., the order identifies the specific products to be provided in fulfillment of the order), the integration server 670 is able to determine the specific products provided to the home site 650 and generate the rebate information report 672 based on the specific products provided to the home site 650. In an aspect, the mapping information 400 and/or the second mapping information 500 may be used to generate the rebate information report 672 based on the specific products provided to the home site 650.

Thus, the integration server 670 provides a reliable way to track rebate eligibility information for parties seeking to redeem or offer rebates, and may reduce rebate tracking costs for the manufacturer 610. Thus, the manufacturer 610) may be able to offer larger rebates, increase profits, offer more rebates, lower the cost of the product, etc. Additionally, the builder 660 may more easily determine rebate eligibility, which may in turn reduce the builder's costs, enabling the builder 660 to increase profits, reduce costs, lower the costs of a home, etc.

Figure 7:
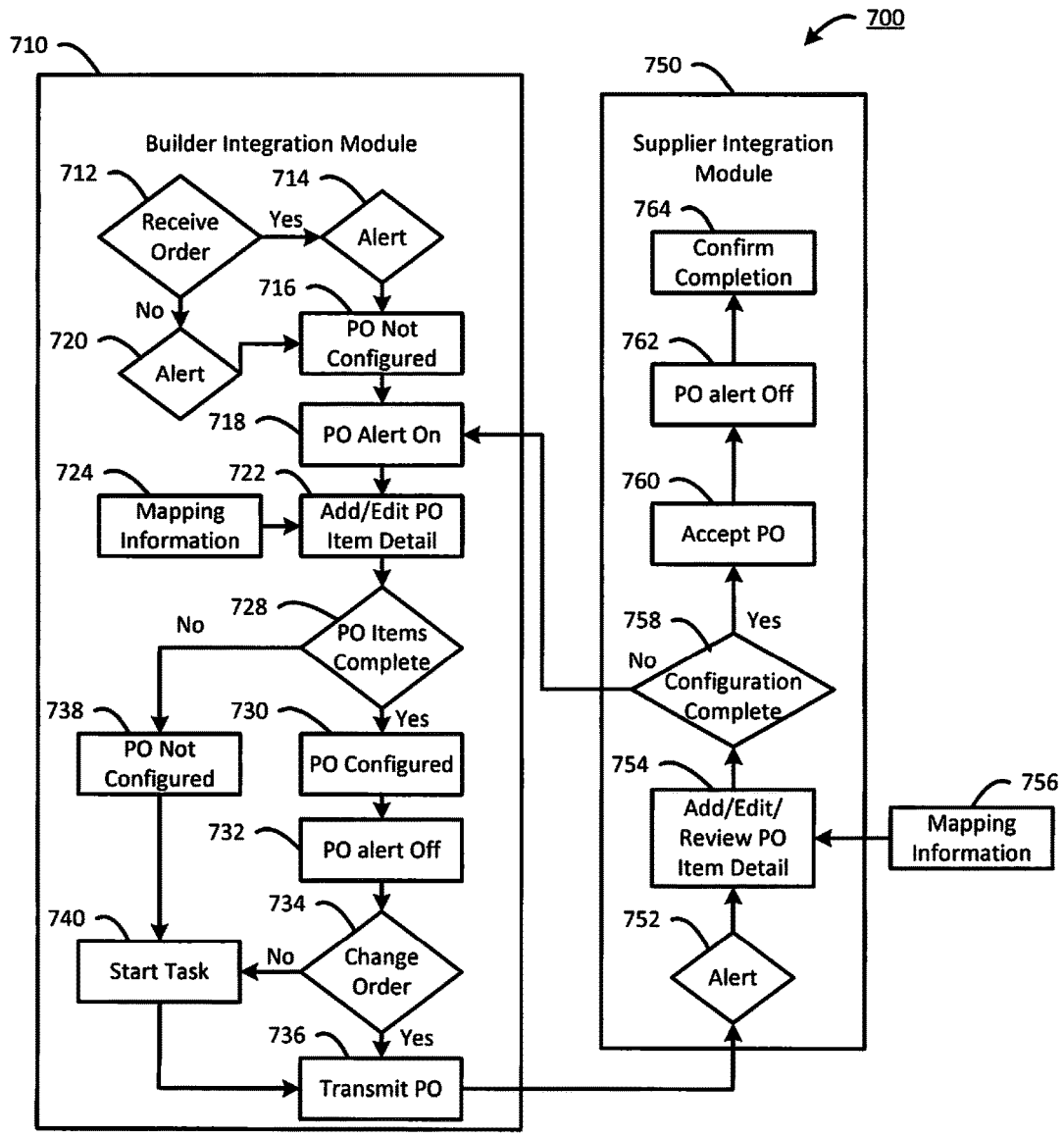
FIG. 7 is an illustrative aspect of a method of coordinating purchase order (PO) information between a builder and a vendor in connection with construction of a home.

Referring to FIG. 7, an illustrative aspect of a method 700 of coordinating purchase order (PO) information between a builder and a vendor in connection with construction of a home is shown. It is noted that the illustrative aspects of the method 700 of FIG. 7 are described with reference to a builder integration module 710 and a supplier integration module 750. The builder integration module 710 may correspond to the builder interface 160 of FIG. 1 and the supplier integration module 750 may correspond to the supplier interface 170 of FIG. 1. Additionally, although illustrated as separate modules, the builder integration module 710 and the supplier integration module 750 may be implemented as a single module configured to perform the operations of the integration server 130 described in FIGS. 1-11 of the present disclosure. Additionally, the builder integration module 710 and the supplier integration module 750 may be stored as instructions (e.g., the instructions 152 of FIG. 1) that are executable by a processor to perform the operations described with reference to FIGS. 1-7 herein. Alternatively or additionally, the builder integration module 710 and the supplier integration module 750 may be implemented as hardware (e.g., one or more processors, digital signal processors, application specific integrated circuits (ASICs), field programmable gate arrays (FPGAs), circuits, etc.), or a combination of hardware and software (e.g., instructions executable by a processor).

The method 700 includes, at 712, receiving an order (e.g., a PO or a CO). In response to receiving the order, a processor may determine whether the order is a CO. If the order is a CO, the method 700 includes, at 714, generating an alert to indicate that a change order has been received. In an aspect, the alert generated at 714 may be indicated to a user via a graphical user interface (GUI). For example, the alert generated at 714 may be communicated to the user via the fourth selectable element 208 of the GUI 200 of FIG. 2.

If the order is not a change order, the method 700 includes, at 720, generating an alert to indicate that a PO has been received. In an aspect, the alert generated at 720 may be indicated to the user via a graphical user interface (GUI). For example, the alert generated at 720 may be communicated to the user via the sixth selectable element 212 of the GUI 200 of FIG. 2.

At 716, the method 700 includes determining whether the order is configured (i.e., does the order identify a specific product or products to be provided by an associated vendor). If the order is not configured, a status indicator associated with the order may be updated, as described with reference to FIG. 3. At 718, the method 700 includes presenting information indicating the alert (e.g., either the alert generated at 714 or the alert generated at 720) to the user. In an aspect the alert may be presented to the user via a GUI, such as the GUI 200 of FIG. 2.

At 722, the method 700 includes prompting the user (e.g., the builder) to configure the order. If the user configures the order, the method 700 may include, at 724, accessing mapping information (e.g., the mapping information 400 of FIG. 4 and/or the mapping information 500 of FIG. 5). The mapping information accessed at 724 may be used to filter or otherwise determine information that may be used by the builder to configure the order, as described with reference to FIGS. 3-5. In an aspect, the mapping information may be the mapping information 156 of FIG. 1.

At 728, the method 700 includes determining whether the builder configured the order in response to the prompt provided at 722. If the builder configured the order the method 700 may include, at 730, updating the status indicator associated with the order to indicate the order has been configured, as described with reference to FIG. 3. In response to updating the status of the order to configured at 730, the method 700 may include, at 732, clearing the alert (e.g., a non-configured order alert). At 734, the method 700 includes determining whether the order is a CO. If the order is a CO, the method 700 includes, at 736, transmitting the order to a backoffice of a vendor (not shown in FIG. 7) associated with the order and providing the order to the supplier integration module 750.

At 738, the method 700 includes receiving an input indicating that the builder does not want to configure the order. In response to receiving the input at 738, the method 700 includes starting a task associated with the order. Starting the task may include assigning the order a PO number, storing the PO in a database (e.g., the PO and CO information database 158 of FIG. 1), entering information into a calendaring system of the builder, etc. After starting the task at 740, the method 700 includes, at 736, transmitting the order to the backoffice of the vendor (not shown in FIG. 7) associated with the order and providing the order to the supplier integration module 750. When the determination at 734 indicates that the configured order is not a change order, the method 700 includes, at 740, starting the task associated with the order.

The method 700 includes, at 752, generating an alert in response to receiving the order at the supplier integration module 750. In an aspect, the alert generated at 752 may be presented to a user (e.g., the vendor) via a GUI. For example, when the order is a CO, the alert presented in the GUI may be presented via the fourth selectable element 208 of the GUI 200 of FIG. 2. As another example, when the order is a PO, the alert presented in the GUI may be presented via the sixth selectable element 212 of the GUI 200 of FIG. 2.

At 754, the method 700 includes prompting the user (e.g., the vendor) to configure the order. If the user configures the order, the method 700 may include, at 756, accessing the mapping information 756. In an aspect, the mapping information 756 may be the same as the mapping information 724. In an alternative aspect, the mapping information 756 may be different from the mapping information 724. For example, the mapping information 756 may include mapping information that maps vendor specific identifiers for each of the products offered by the vendor to builder specific identifiers for multiple builders, and the mapping information 724 may include mapping information that maps builder specific identifiers for each of the products used by the builder to vendor specific identifiers for multiple vendors that provide one or more of the products used by the builder. The mapping information accessed at 756 may be used to filter or otherwise determine information that may be used by the vendor to configure the order, as described with reference to FIGS. 3-5. In an aspect, the mapping information may be the mapping information 156 of FIG. 1 and may include the mapping information 400 of FIG. 4 and/or the mapping information 500 of FIG. 5.

At 758, the method 700 includes determining whether configuration of the order is complete. This may include determining whether any changes have been made to the order by the vendor and/or determining whether the order remains a non-configured order. If the configuration of the order is not complete, the method 700 may include verifying that the alerts generated at 718 and at 752 are active. By keeping the alert generated at 718 and the alert generated at 752 active, the parties may receive the alert each time they use the application (or web browser) to access information stored at the integration server. This may prevent the parties (e.g., the builder and the vendor) from forgetting about the order and that the order needs to be configured before the products associated with the order can be provided.

If, at 758, the method 700 determines that the order configuration is complete (i.e., confirmed by the builder, the vendor, or both the builder and the vendor), the status indicator associated with the order may be updated to confirmed, at 760, and the alert generated at 752 may be turned off. At 764, the method 700 includes receiving information indicating that the order has been fulfilled (e.g., the products identified in the configured order have been provided by the vendor). By receiving confirmation that that order has been fulfilled, the builder is able to identify the products used to build the home, which may be beneficial for establishing the builder's eligibility for one or more rebates. Additionally, by confirming completion of the order, the vendor may receive payment from the builder more quickly. Additional benefits and features provided by the method 700 have been illustrated with reference to FIGS. 1-6 and are not repeated here for simplicity.

Figure 8:
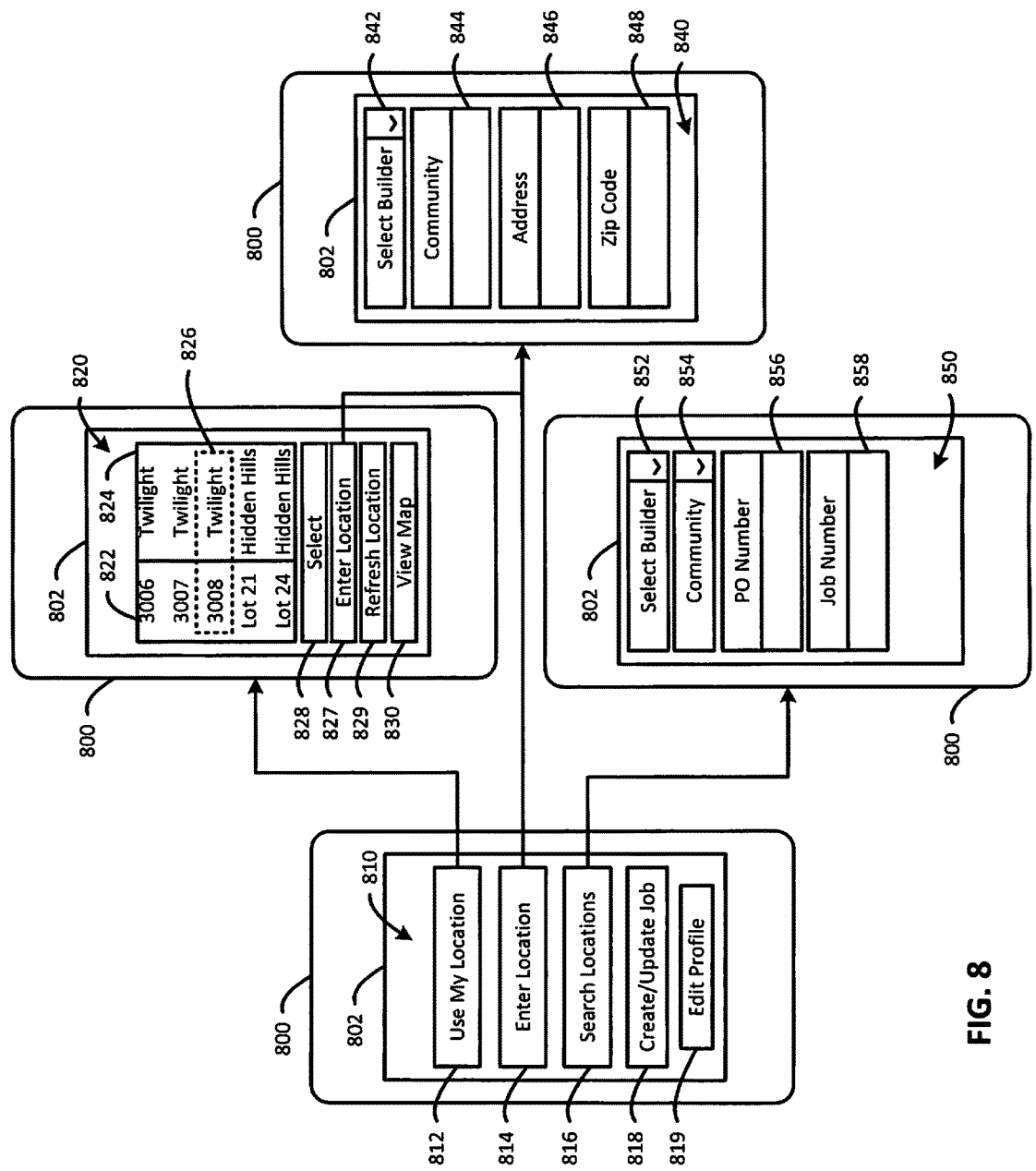
FIG. 8 shows illustrative graphical user interfaces (GUIs) that may be used to generate and store information associated with a construction project.

Referring to FIG. 8, illustrative graphical user interfaces (GUIs) that may be used to generate and store information associated with a construction project are shown. As shown in FIG. 8, an electronic device 800 may include a display device having a display area 802. The electronic device 800 may be configured to present various GUIs, such as a first GUI 810, a second GUI 820, a third GUI 840, and a fourth GUI 850 within the display area 802. In an aspect, the electronic device 800 may be a portable communication device, such as a smartphone, a personal digital assistant (PDA), a laptop computing device, a tablet computing device, or another electronic device operable to present the various GUIs of FIGS. 8-12, and to perform the operations of the electronic device 800, as described with reference to FIGS. 8-13.

In an aspect, the electronic device 800 includes a camera module (not shown in FIG. 8) configured to enable a user of the electronic device 800 to capture images (e.g., photos). The electronic device 800 may also include a processor (not shown in FIG. 8) and a memory (not shown in FIG. 8). The memory may store instructions that, when executed by the processor, cause the processor to present the various GUIs of FIGS. 8-12, to activate camera module, to receive images from the camera module, and to perform the operations described with reference to FIGS. 8-13. The images may be stored in the memory permanently (i.e., until deleted by a user of the electronic device) or temporarily (i.e., until an image has been processed or transmitted to a remote device, such as the integration server 130 of FIG. 1). In an aspect, the electronic device 800 includes wireless communication module (e.g., a transmitter, a receiver, or a transceiver) configured to provide wireless communication capabilities (e.g., network access, internet access, etc.) via one or more networks (e.g. a local area network (LAN), the internet, a cellular voice network, a cellular data network, or any other type of wired or wireless network) using one or more network protocols (e.g., a TCP/IP network protocol, a long term evolution (LTE) cellular communication protocol, 3G/4G cellular communications protocols, etc., or a combination of wired or wireless communication protocols). Additionally, the electronic device 800 may include a geographical information system (GIS) configured to provide location determination capabilities to the user of the electronic device. In an aspect, the display device of the electronic device 800 may have a touch screen capability and the user may interact with the various GUIs of FIGS. 8-12 by touching a region (e.g., a menu option of a GUI, etc.) within the display area 802 of the display device. Alternatively or additionally, the electronic device 800 may include other user interface controls (e.g., arrow buttons, a select button, keypad, number pad, etc.) that may be used to provide input to and to interact with the various features of the various GUIs of FIGS. 8-12.

The various GUIs 810, 820, 840, 850, in conjunction with one or more of the GUIs described with reference to FIGS. 9-12, may be used to generate information associated with a construction project (e.g., the construction of a home) and to store the information locally (e.g., at the electronic device 800), at a server (e.g., the integration server 130 of FIG. 1), or both. As shown in FIG. 8, the first GUI 810 includes a first selectable option 812, a second selectable option 814, a third selectable option 816, a fourth selectable option 818, and a fifth selectable option 819. The first selectable option 812 may be selected by a user when the user wants to determine one or more addresses near the user's current location. For example, when a vendor arrives at a home site to provide a product, the vendor may select the first selectable option 812. In response to the selection of the first selectable option 812, the electronic device 800 may use the GIS to perform determine one or more addresses near the user's (or the electronic device 800's) current location.

The one or more addresses determined by the GIS may be presented in the second GUI 820. As shown in FIG. 8, the one or more addresses may be presented as a list within the second GUI 820. Each of the addresses includes a street number 822 and a street name 824. The user may select a particular address of the one or more address, as indicated by the box 826. The list of one or more addresses may be scrolled up or down to view additional addresses determined to be near the user's (or the electronic device 800's) current location. In an aspect, the addresses presented in the list may include at least one address associated with a construction site (e.g., a site where a home is being built, remodeled, etc.).

Figure 9:
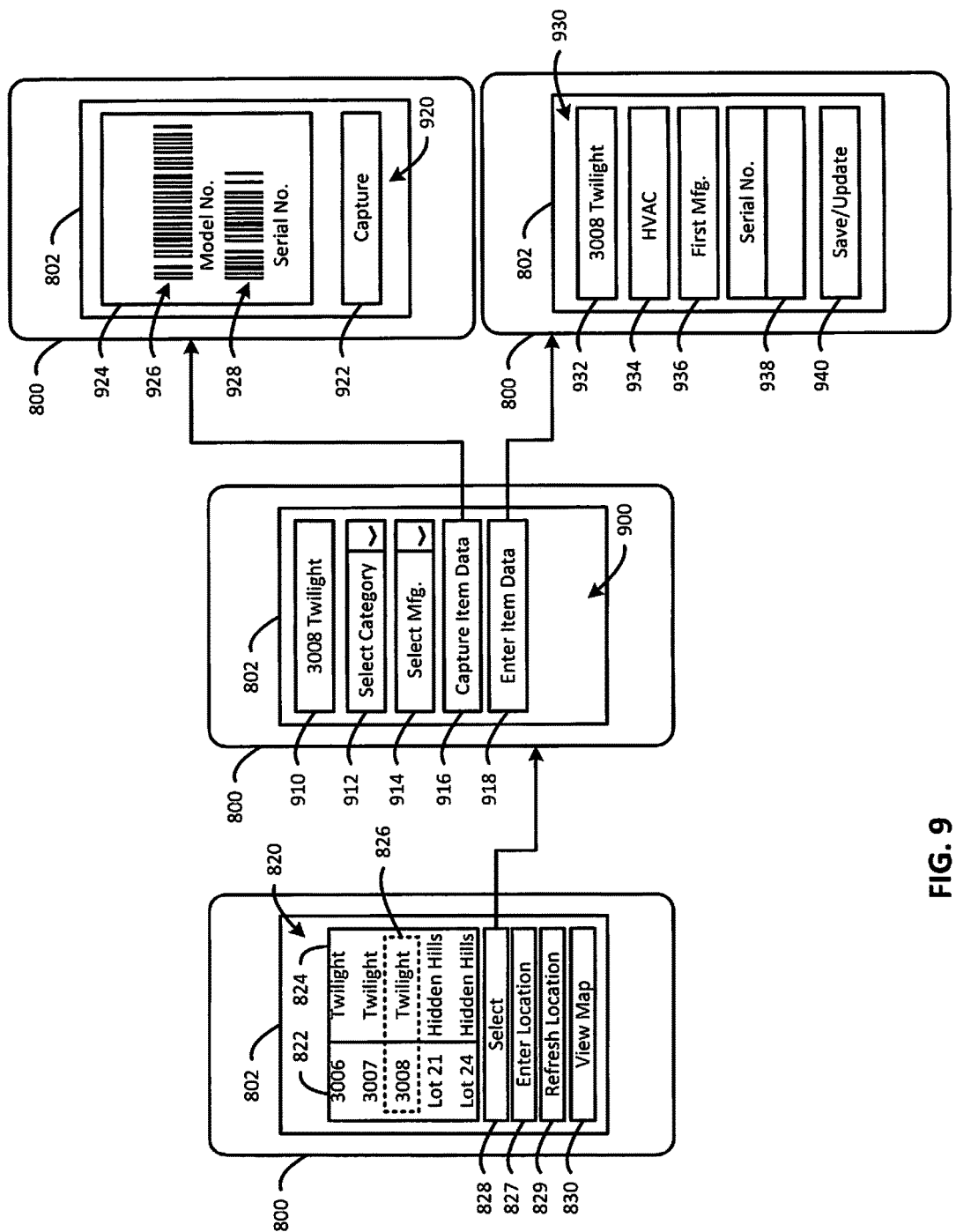
FIG. 9 shows illustrative aspects of graphical user interfaces (GUIs) that may be used to generate, capture, and store information associated with a product provided to a location.
Figure 10:
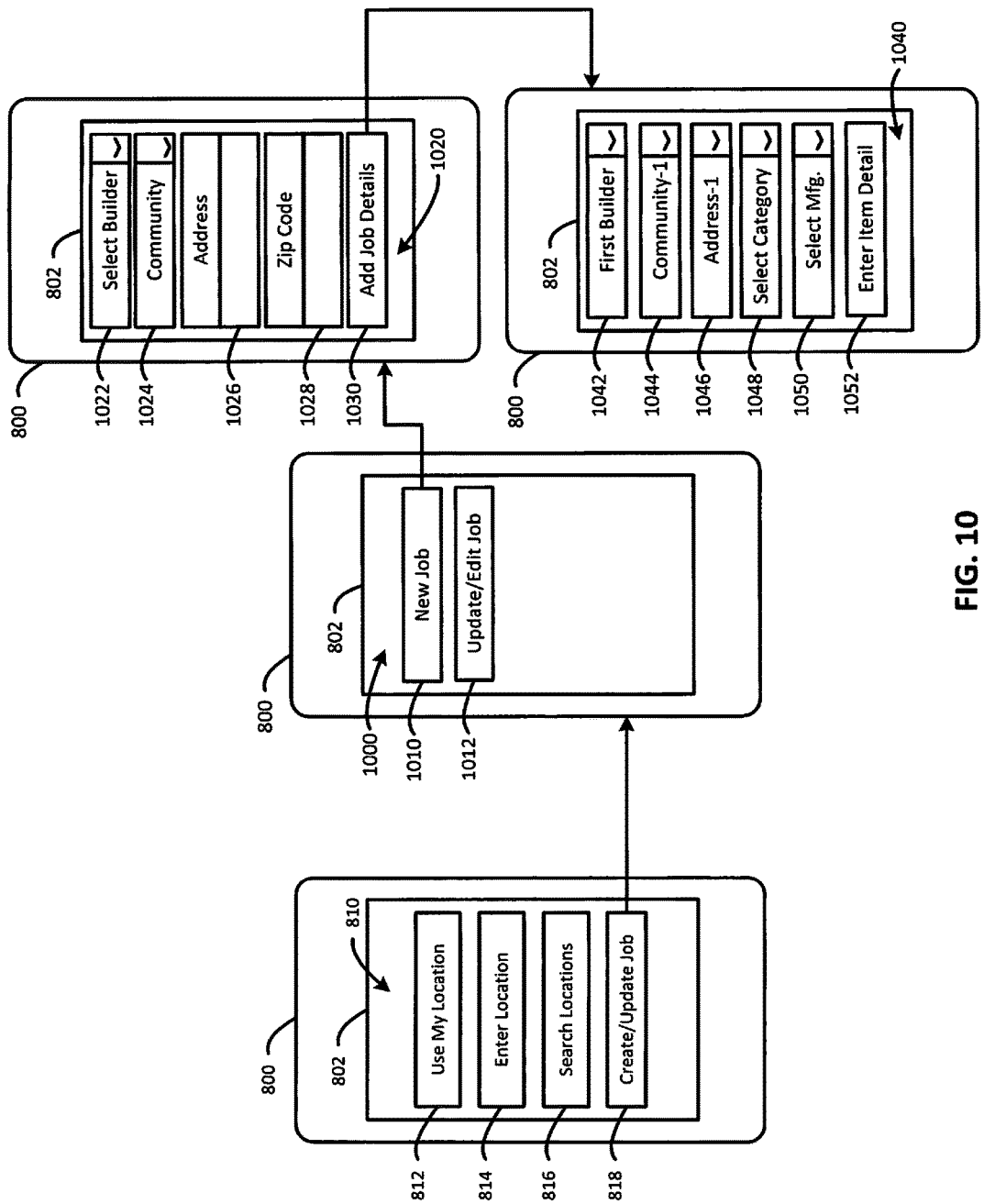
FIG. 10 shows illustrative aspects of graphical user interfaces (GUIs) for creating and updating job information using a portable electronic device.
Figure 11:
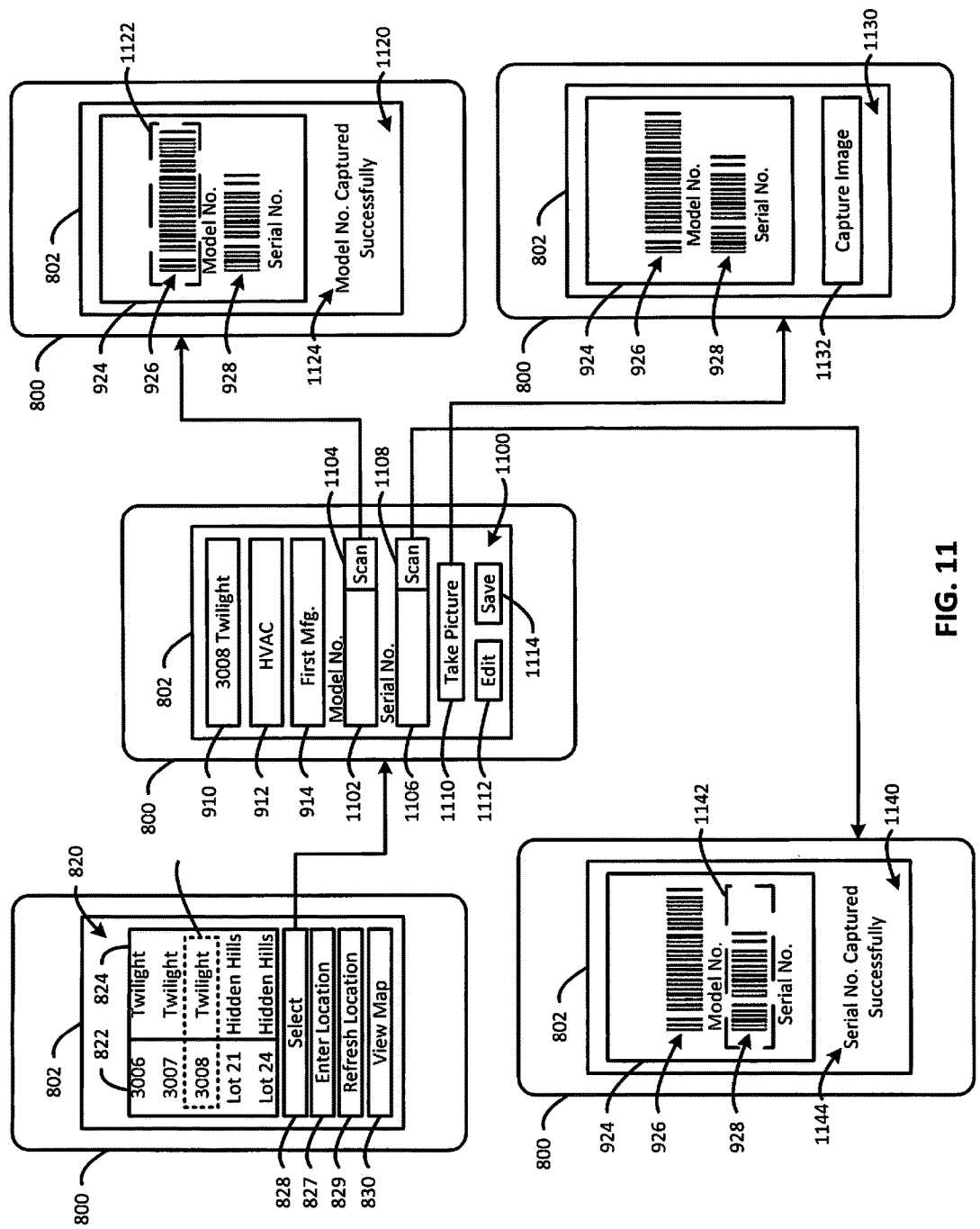
FIG. 11 shows additional illustrative aspects of graphical user interfaces that may be used to capture item data using an electronic device are shown.

Additionally, the second GUI 820 includes a first selectable option 828, a second selectable option 830, a third selectable option 827, and a fourth selectable option 829. When the user is satisfied that the selected address indicated by the box 826 is correct, the user may then provide an input to the electronic device 800 indicating a selection of the first selectable option 828. This may indicate that the information gathered in subsequently presented GUIs, as described with reference to FIGS. 9-11, is to be stored at the integration server in association with the selected address or a PO or CO associated with the selected address. Using the GIS may simplify the process for inputting an address. Selection of the second selectable option may cause the electronic device 800 to present another GUI (not shown) that includes a map showing the one or more addresses determined by the GIS. The user may then select the address using indicators corresponding to the one or more addresses that may be presented within the map. Selection of one of the map indicators may be equivalent to selection of an address using the box 826 and the first selectable option 828.

When the user is unable to locate an address of interest using the list of addresses or the view map functionality, the user may select the third selectable option 827 to manually enter the address, as described with reference the third GUI 840, or the user may select the fourth selectable option 829 to refresh the list of one or more addresses. Selection of the third selectable option 827 may cause the electronic device to present the third GUI 840. Operations and features of the third GUI 840 are described in detail below. Selection of the fourth selectable option 829 may refresh the list of addresses presented within the second GUI 820.

Presenting the addresses on a map may enable the user to more accurately determine the correct address. For example, in new sub-division development home construction may begin prior to street numbers and/or street names being assigned. In these situations, home sites may be identified by a lot number or a lot number and a street name, such as Lot 21 Hidden Hills and Lot 24 Hidden Hills shown within the GUI 820. When the user is trying to determine which lot he is standing in front of, the map information presented in response to selection of the second selectable option 830 may help the user more accurately determine the correct location. Thus, the GUI 820 provides a simple, fast, and accurate way for the user to determine the location of a particular job site where information (e.g., products delivered to the location) is to be generated and stored in associated with the location.

In an aspect, the one or more addresses determined by the GIS may be filtered by the electronic device 800 based on information stored at the integration server. For example, the electronic device 800 may provide the list of one or more addresses to the integration server and the integration server may then filter the one or more addresses based on orders (e.g., purchase orders, change orders, etc. that are associated with the user or a company the user works for (e.g., a vendor). For example, the user of the electronic device 800 may be associated with a first vendor and the first vendor may have purchase orders to provide products to a first address (e.g., 3008 Twilight) and a second address (e.g., 3007 Twilight). The one or more addresses determined by the GIS may be provided to the integration server and a list of addresses for which the first vendor has purchase orders (POs) or change orders (COs) may be returned to the electronic device 800 for presentation in the second GUI 820. Thus, if the results were filtered, the second GUI 820 may only show the first address and the second address and may not show the other addresses (e.g., 3006 Twilight, Lot 21 Hidden Hills, and Lot 24 Hidden Hills). Filtering the results in this manner may further simplify the location selection process by reducing the number of addresses presented within the second GUI 820 and by only presenting addresses for which the user has orders.

In an additional aspect, the one or more addresses determined by the GIS may be cross-referenced with building development information. For example, in a new sub-division development there may be multiple builders building homes in the sub-division. Typically, each of the home sites within the sub-division is associated with only one of the builders. The integration server (e.g., the integration server 130 of FIG. 1) may store information associating each of the addresses with a particular builder. Thus, a selection of an address from the GUI 820 may identify a selected address and may further identify a particular builder and a particular community or sub-division. Additional features related to this aspect are described with reference to FIG. 9. Additionally, the current location of the electronic device 800 may be used to identify the community (e.g., the sub-division development, etc.) and then the one or more addresses may be filtered or determined using one or more of the techniques described herein (e.g., using POs, COs, builder information, etc.).

The second selectable option 814 may be selected by the user when the GIS of the electronic device 800 is not available (e.g., due to poor signal conditions), when the electronic device 800 does not include a GIS, or when the electronic device 800 is unable to communicate with the integration server. As shown in FIG. 8, selection of the second selectable option 814 (or the third selectable option 827) may cause the electronic device 800 (or the processor of the electronic device 800) to initiate presentation of the third GUI 840 within the display area 802. The third GUI 840 includes a first selectable option 842, a first text box 844, a second text box 846, and a third text box 848. The first selectable option 842 may be used to specify a particular builder associated with the location (e.g., the home site). In an aspect, the first selectable option 842 may be provided as a dropdown list. In an additional or alternative aspect, the first selectable option 842 may be configured to receive text input and the user may type the name of the builder into the first selectable option.

The first text box 844 may be used to input (e.g., via text input) information identifying a particular community (e.g., a sub-division name) associated with the location. The second text box 850 may be used to input (e.g., via text input) information indicating a street number and a street name associated with the location. The third text box 854 may be used to enter (e.g., via numeric input) a zip code associated with the location. In an aspect, the zip code may be automatically populated based on the community and address information (e.g., the inputs to the first text box 844 and the second text box 846, respectively). It is noted that the third GUI 840 is described for purposes of illustration, rather than limitation. For example, additional information (e.g., city, state, etc.) may be input into the third GUI 840 to further identify the location, and is not shown in FIG. 8 for conciseness and to streamline description. However, such additional information and its equivalents are considered within the scope of the present disclosure.

By enabling the user to enter the location manually, the user may be able to generate and store the information associated with the specified location at the integration server, as described with reference to FIGS. 9 and 10, even when the electronic device 800 does not include a GIS, or when the GIS is not operable (e.g., due to poor signal conditions). In an aspect, the second selectable option 814 may be presented within the second GUI 820 in addition to or alternatively to presenting the second selectable option 814 within the first GUI 810, and may be selected by the user when the GIS is unable to determine the desired location (e.g., when the list of one or more addresses presented within the second GUI 820 does not include the address the user desires to select).

The third selectable option 816 may be selected by the user when the user is not sure of the address, but the user has some additional piece of information that may be used to determine the address. For example, selection of the third selectable option 816 may cause the electronic device 800 to initiate presentation of the fourth GUI 850. As shown in FIG. 8, the fourth GUI 850 includes a first selectable option 852, a second selectable option 854, a first text box 856, and a second text box 858. The fourth GUI 850 may enable the user to search for a particular address using one or more of the selectable options 852, 854 and the text boxes 856, 858 of the fourth GUI 850.

For example, the first selectable option 852 may enable the user to search for addresses based on a builder associated with a location (e.g., a home site) where the user is to provide a product. As shown in FIG. 8, the first selectable option 852 may be presented as a dropdown list and selection of a particular builder may initiate presentation of one or more addresses (e.g., using a GUI similar to the second GUI 820) associated with orders that the user (e.g., a vendor) has with the particular selected builder. Additionally or alternatively, the user may also type the name of the builder into the first selectable option 852 via a text input to specify the builder. In an aspect, the one or more addresses may be determined by transmitting a query from the electronic device 800 to the integration server and receiving results from the query from the integration server at the electronic device 800. Alternatively or additionally, the memory of the electronic device 800 may store a database that includes information that identifies orders received by the user from various builders and the one or more addresses may be determined from the database stored at the memory of the electronic device 800. In another additional or alternative aspect, the database stored at the memory of electronic device 800 may include less information than is stored at the integration server, and the electronic device 800 may transmit the query to the integration server when the results generated based on the database at the memory of the electronic device did not include the location desired by the user or when the query generated no results.

The second selectable option 854 may enable the user to search for addresses based on a communication associated with the location where the user is to provide a product. As shown in FIG. 8, the second selectable option 854 may be presented as a dropdown list and selection of a particular community may initiate presentation of one or more addresses (e.g., using a GUI similar to the second GUI 820) associated with orders that the user has within the particular selected community. Additionally or alternatively, the user may also type the name of the community into the second selectable option 854. A GUI similar to the GUI 820 may be populated with one or more addresses within the particular selected community that are associated with locations for which the user has received orders to provide product(s). The one or more addresses may be determined in a manner similar to the methods described above with respect to the first selectable option 852, such as by querying the integration server, querying a local database stored at the memory of the electronic device 800, or both.

The first text box 856 may enable the user to search for an address based on a PO (or CO) number. For example, the user may have information that identifies a PO number associated with an order, but may not have information that indicates the address where the products to be provided in association with the PO are to be delivered and/or installed. The user may input the PO number into the first text box 856 to initiate a query to the integration server and/or the local database stored at the memory of the electronic device 800 to determine the address associated with the PO number.

The second box 858 may enable the user to search for an address based on a job number (e.g., a number used by the vendor to identify the job or order, as opposed to the PO number, which may be a number used by the builder to identify the job or order). For example, the user may have information that identifies a job number associated with an order, but may not have information that indicates the address where the products to be provided in association with the job are to be delivered and/or installed. The user may input the job number into the second text box 858 to initiate a query to the integration server and/or the local database stored at the memory of the electronic device 800 to determine the address associated with the job number.

The queries described with reference to the GUIs 820, 840, 850 may be transmitted from the electronic device 800 to integration server and the search results may be received at the electronic device 800 from the integration server using the wireless communication module of the electronic device 800. As can be appreciated, the selectable options 812, 814, 816 and their respective GUIs 820, 840, 850 provide a robust and diverse user interface for identifying locations. By providing multiple ways to identify a location, a user of the electronic device is able to more accurately specify the location and/or determine the location (e.g., the addresses), even when user does not have information that identifies the location (e.g., when the user only has a PO number or a job number).

The fourth selectable option 818 may enable the user to create a new order (e.g., a new PO, a new CO, etc.) or to update an existing order (e.g., update or configure an existing PO or CO, as described with reference to FIG. 3 or a completed order). Illustrative aspects of the features provided in response to selection of the fourth selectable option 818 are described with reference to FIG. 10.

The fifth selectable option 819 may enable a user to edit a user profile associated with an account. The account may provide access to an application that is installed on the electronic device 800 and that is configured to provide the various GUIs of FIGS. 2, 3, 8-12. Additionally, the application may include the instructions that, when executed by the processor of the electronic device 800, cause the electronic device 800 to perform the operations described with reference to FIGS. 1-13. The application may be downloaded and installed on the device from a website, a mobile device appstore, a computer-readable storage medium (e.g., a compact disc (CD), etc.), or may be an application provided via a web-browser of the electronic device 800, as described with reference to FIGS. 1-7. Additionally, a user of the electronic device may pay a fee for using the application. For example, the fee may be a periodic subscription fee (e.g., a monthly use fee, annual use fee, or some other periodic fee structure) or may be a one-time purchase fee (e.g., the user pays a fee to purchase the application and may use the application in perpetuity). These fee types are merely illustrative and other types of fees or combinations of fees may be charged for providing access to the application. Additional illustrative aspects of user profiles are described with reference to FIG. 12.

Referring to FIG. 9, illustrative aspects of graphical user interfaces (GUIs) that may be used to generate, capture, and store information associated with a product provided to a location are shown. In FIG. 9, a first GUI 900, a second GUI 920, a third GUI 930, and the second GUI 820 of FIG. 8 is shown. As described with reference to FIG. 8, a selection of the first selectable option 828 may indicate that the information gathered in subsequently presented GUIs (e.g., the GUIs 900, 920, 930 of FIG. 9) is to be stored at the integration server in association with the selected address (e.g., the address indicated in the box 826) or a PO or CO associated with the selected address.

To illustrate, in response to selection of the first selectable element 828 of the second GUI 820, the electronic device 800 (or the processor of the electronic device 800) may initiate presentation of the first GUI 900 within the display area 802 of the display device. As shown in FIG. 9, the first GUI 900 includes a location identifier 910, a select category option 912, a select manufacturer option 914, a capture item data control 916, and an enter item data control 918. The location identifier 910 may be populated based on the address selected (e.g., the address indicated by the box 826 when the first selectable option 828 was selected). The select category option 912 may be provided as a dropdown list and may present a list of product categories (e.g., the categories 410 of FIG. 4, sub-categories, other product group identifiers, or a combination thereof). The category may be associated with an industry (e.g., HVAC, plumbing, appliances, electrical, etc.) of the user of the electronic device 800, with a category of products (e.g., HVAC products, plumbing products, appliances, electrical components or services, etc.) that the user of the electronic device 800 provides. In some aspects, the user of the electronic device 800 may not be the provider of products or services and is merely capturing information (e.g., on behalf of a builder, a manufacturer, etc.). In these aspects, the user may select the category based on a product of interest (e.g., a product that the user is trying to capture information for). In an additional or alternative aspect, the category identified by the select category option 912 may be prepopulated based on other information, such as information included in a configured PO or CO that is retrieved from the integration server, or information (e.g., an industry associated with the user) included in the profile of the user's account, as described with reference to FIG. 12.

For example, the user of the electronic device may select an address using the box 826 and the first selectable option 828, and in response to the selection of the address, the electronic device 800 may query the integration server and/or the database stored at the memory of the electronic device 800 to identify one or more configured POs or configured COs associated with the selected address. As explained above with respect to FIG. 3, when the PO or the CO is configured, the specific product to be provided may be known to the vendor (e.g., based on a model number associated with the SKU number or included in the description). The information included in the configured PO or the configured CO may be used to determine the category based on mapping information (e.g., the mapping information 400 of FIG. 4 and/or the mapping information 500 of FIG. 5). The category may be determined by the integration server and transmitted back to the electronic device 800 or may be determined by the electronic device 800 without the assistance of the integration server. When the category is populated automatically, the user may change or modify the prepopulated category using the select category option 912 (e.g., by selecting a different category from the dropdown list or by providing text input).

The select manufacturer option 914 may be provided as a dropdown list and may present a list of product manufacturers that manufacture products within the category indicated by the select category option 912. In an additional or alternative aspect, the manufacturer identified by the select manufacturer option 914 may be prepopulated based on other information, such as information included in a configured PO or CO, as described with reference to the category information above.

In an aspect, the first GUI 900 may include a select builder option (not shown) that enables a vendor to specify a builder associated with a home site. This may enable a vendor that does not use the system 100 of FIG. 1 to provide information to the integration server that may then be stored in association with and accessible to the builder (e.g., for rebate purposes, etc.). In an aspect, the builder information may be populated automatically. For example, when the user of the electronic device 800 uses the system 100 of FIG. 1, the electronic device may query the integration server using the address to obtain the builder information automatically.

Selection of the capture item data control 916 may cause the electronic device 800 to activate the camera module and present the second GUI 920. As shown in FIG. 9, the second GUI 920 includes a capture control 922 that may be displayed as a graphical overlay within the display area 802. Selection of the capture control 922 may cause the camera module to capture one or more images and/or to initiate processing of the one or more images. The user of the electronic device 800 may point or otherwise aim the camera lens of the camera module towards a label of the product to be provided at the selected location (e.g., the location indicated by the location identifier 910), and the camera module may cause at least a portion of the label to be displayed at the second GUI 920.

To illustrate, in FIG. 9, a label 924 is shown presented within the second GUI 920 and includes a first barcode 926 and a second barcode 928. The first barcode 926 may be associated with a model number of the product to be provided at the selected location and the second barcode 928 may be associated with a serial number of the product to be provided at the selected location. The model number and the serial number may be printed on the label 924 (e.g., as numbers, letters, or letters and numbers proximate the respective barcodes) or may not be printed on the label. In an aspect, selection of the capture control 922 may cause the camera module to generate and store an image corresponding to at least a portion of the label 924 (and other features present within a field of view of the camera lens) at the memory of the electronic device 800. The image may be subsequently transmitted to the integration server and the integration server may store the image in association with the PO or the CO associated with the product provided. By storing the image of the model number and the serial number in association with the PO or the CO, data validation may be performed. For example, a configured PO may identify a specific product by a model number. During installation or delivery of the product, a vendor providing the product may use the electronic device 800 to capture item data and the item data may be stored at the integration server. The builder may subsequently view the image to verify that the model number indicated by the label matches the model number identified in the configured PO.

In an aspect, the electronic device 800 and/or the integration server may include a barcode reading capability that enables the respective devices to process the images generated by the camera module in response to selections of the capture control 922 and to determine the model number and/or the serial number of the product provided to the location identified by the location identifier 910. In an aspect, the barcode reader of the electronic device may operate independently from the image of the label 924. For example, the image may be captured and stored at the electronic device 800, the integration server, or both, and the barcode reader of the electronic device may separately read the information (e.g., the model number, the serial number, or both) from the label without using the image. The integration server (e.g., the integration server 130 of FIG. 1) may include image processing software or modules operable process the image captured by the electronic device to identify the barcodes 926, 928 and the capture the model number and/or serial number from the identified barcodes. Thus, the electronic device 800 may process the first barcode 926 and/or the second barcode 928 of the label 124 to determine the model number and serial number of the product and transmit the model number and/or the serial number to the integration server. The integration server may store the model number and/or the serial number in association with the corresponding PO or CO. In an aspect, the electronic device may send the integration server both the image including the first barcode 926 and the second barcode 928 and the respective model number and serial numbers.

The information transmitted to the integration server in response to the selection of the capture control 922 may include information in addition to the image. For example, the information provided via the first GUI 900 may be combined with the image and/or the model/serial number information and transmitted to the integration server. The additional information may enable the integration server to store the image and/or the model/serial number information in association with the corresponding PO (or CO).

In an aspect, the electronic device 800 may be configured to present alerts via the second GUI 200. The alerts may be associated with the image capture and barcode reading process. For example, the electronic device 800 may automatically detect the barcodes 926 and 924 prior to selection of the capture control 922. When the electronic device 800 is unable to read one or more of the barcodes, the electronic device 800 may provide an alert to indicate that the electronic device is unable read the barcode(s). The alert may be provided by highlighting (generating a graphical overlay, such as outlining) the barcode(s) that the electronic device 800 is unable to read. Additionally, when the electronic device 800 is unable to read at least one barcode, the electronic device 800 may cause an enter item data control to be presented within the second GUI 920. Selection of the enter item data control presented within the second GUI 920 may cause the electronic device 800 to perform operations similar to the operations described below with respect to selection of the enter item data control 918 of the first GUI 900.

In an additional or alternative aspect, the electronic device 800 (and/or the integration server) may be configured to only read particular information from the label. For example, because the model number may be specified in the configured PO, the model information read from the first barcode 926 may be redundant. The electronic device 800 may determine that the second barcode 928 corresponds to a barcode of interest (e.g., the second barcode 928 associated with the serial number) and perform barcode reading and processing of the barcode of interest while ignoring or not processing barcodes that are not of interest (e.g., the first barcode 926 associated with the model number). Thus, the electronic device 800 may be configured to determine whether information included in the label 924 is new information (e.g., information not already stored in association with a configured or non-configured PO) or redundant information (e.g., information already stored in association with a configured or non-configured PO) and capture only the new information.

Selection of the enter item data control 918 may cause the electronic device 800 to present the third GUI 930. As shown in FIG. 9, the third GUI 930 includes a location identifier, a category identifier 934, a manufacturer identifier 936, a first text box 938 and a save/update control 940. The information presented within the location identifier 932 may correspond to the location indicated by the location identifier 910, the information presented in the category identifier 934 may correspond to the category selected using the select category control 912 of the first GUI 900, and information presented in the manufacturer identifier 936 may correspond to the manufacturer selected using the select manufacturer control 914 of the first GUI 900. The user may input the serial number of the product provided to the location identified by the location identifier 932 into the first text box 938 and select the save/update control 940. Selection of the save/update control 940 may cause the electronic device to transmit the serial number to the integration server as described with reference to the second GUI 920 above. The serial number may be sent to the integration server with all or a portion of the information presented in the identifiers 932, 934, 936. In an aspect, the third GUI 930 may include additional text boxes for providing additional input. For example, the third GUI 930 may include a second text box (not shown in FIG. 9) for providing input relating to the model number of the product provided to the location identified by the location identifier 932. Additionally, selection of the save/update control 940 may cause the electronic device 800 to transmit the image captured by the camera module to the integration server along with the information presented in the identifiers 932, 934, 936.

As described above, the third GUI 930 may be presented in response to selection of a enter item data control 918 presented within the second GUI 920 (i.e., when the electronic device 800 is unable to read at least one barcode). When the electronic device 800 is able to read some, but not all of the barcodes of interest, text boxes of the third GUI 930 may be automatically populated with information associated with the readable barcodes of interest and other text boxes associated with barcodes of interest that the electronic device 800 cannot read may be blank.

Capturing and storing serial number information may provide or enable a more accurate tracking of products through a supply chain. For example, the manufacturer may manufacture thousands of products with the same model number, but each of the products may have a unique serial number. If a portion of those products were made using components from a first vendor of the manufacturer and the components from the first vendor are the source of a product recall, the manufacturer may be able to provide recall notices to only those end consumers that received the product made using the components from the first vendor, while not providing notices to other end consumers who received the product made using components from a different vendor.

Additionally, by capturing the serial number information, the manufacturer may feel more confident that the builder actually qualifies for all of the rebates claimed. For example, the manufacturer may make thousands of products with the same model number, but each of the products may have a unique serial number. Thus, when the builder claims, for example, five hundred (500) rebates using the model number, the manufacturer has no way to verify that all five hundred (500) of the rebates are valid. However, if the manufacturer has access to information that identifies the five hundred (500) unique serial numbers corresponding the five hundred (500) products installed by the builder, the manufacturer may rest assured that the rebates are validly claimed by the builder. This may reduce an amount of rebates that the manufacturer pays that were not valid (e.g., the builder claims five hundred (500) rebates but only qualified for four hundred (400) and claimed five hundred (500) through record keeping errors). Additionally, this may help a builder prove up rebates that the builder is claiming when questioned by a manufacturer. Thus, the features provided by the electronic device 800, as described with reference to FIGS. 8 and 9, may provide an improved system for tracking rebate information.

Additionally, although described with reference to barcodes, other optically machine-readable codes may be used. For example, the electronic device 800 may be configured to read linear barcodes (e.g., two width linear barcodes and many-width linear barcodes) and matrix barcodes (e.g., quick response (QR) codes), or any other type of optically machine-readable codes. Additionally, the electronic device 800 may be configured to capture the information of interest (e.g., model number, serial number, etc.) using other technologies, such as radio frequency identification (RFID) tags, depending on the particular environment in which the integration server and/or the electronic device 800 are deployed.

Further, the electronic device 800 and the GUIs described with reference to FIGS. 8 and 9 may be used by a builder to validate and/or collect information associated with products provided by multiple vendors in connection with the construction of a home. For example, the builder may build a home and during the construction process may utilize dozens of different vendors. Some of the vendors may use the application and/or the web browser application described with reference to FIGS. 1-3 to generate, transmit, receive, and configure/update POs and COs. The electronic device 800 may also be used by such vendors to complete the providing of the products associated with a particular PO (e.g., by scanning and storing information captured from a label of the installed or provided product at the integration server), as described with reference to FIGS. 8 and 9. However, some of the vendors used by the builder to build the home may not utilize the system 100 of FIG. 1. Thus, the builder may not be sure that these vendors provided the correct products. The builder, and/or a third party (e.g., a manufacture, wholesaler, supplier, etc.), may visit the home site and use the electronic device 800 to capture item data (or enter item data) by scanning labels on the products installed or delivered to the home site. This may enable the builder and/or the third party to verify and validate the products provided by vendors that do not use the system 100 of FIG. 1. As another example, the builder may require or incentivize the vendors that are not using the system 100 of FIG. 1 to use an electronic device 800, such as, for example, by paying the vendors an additional amount for utilizing the electronic device 800 to capture item data. As yet another example, manufacturers may require or incentivize (e.g., using rebates or product price discounts) suppliers and wholesalers to use the electronic device 800.

In an aspect, the features provided by the electronic device 800, as described with reference to FIGS. 8-10, may be provided through an application that may be downloaded and installed on the electronic device 800 for free, for a fee, or using some other payment method, such as a promotional code, etc. This may enable the vendors, the suppliers, and the wholesalers to install the application on an existing device used by the supplier or the wholesaler at little or no cost while enabling the builder and/or the manufacturer to obtain accurate information regarding products distributed in a supply chain and may also provide additional information (e.g., information collected by vendors, suppliers, and wholesalers that are not using the system 100 of FIG. 1).

Referring to FIG. 10, illustrative aspects of graphical user interfaces (GUIs) for creating and updating job information using a portable electronic device are shown. In FIG. 10, a first GUI 1000, a second GUI 1020, a third GUI 1040, and the first GUI 810 of FIG. 8 is shown. As described with reference to FIG. 8, a selection of the fourth selectable option 818 may enable the user to create a new order (e.g., a new PO, a new CO, etc.) or to update an existing order (e.g., update or configure an existing PO or CO, as described with reference to FIG. 3, or a completed order, as described with reference to FIGS. 8 and 9).

For example, in response to a selection of the fourth selectable option 818 within the first GUI 810, the electronic device 800 (or the processor of the electronic device 800) may initiate presentation of the first GUI 1000. As shown in FIG. 10, the first GUI 1000 include a first selectable option 1010 and a second selectable option 1012. The first selectable option 1010 may be selected to create a new job, PO, CO, etc. The second selectable option 1012 may be selected to update, modify, and/or edit and existing job, PO, CO, etc.

In response to a selection of the first selectable option 1010, the electronic device may initiate presentation of the second GUI 1020. As shown in FIG. 10, the second GUI 1020 include a first selectable option 1022 (e.g., a select builder dropdown list) for selecting a builder associated with the job, a second selectable option 1024 (e.g., a select community dropdown list) for selecting a neighborhood, sub-division, or other type of development associated with the job, a first text box 1026 for entering an address (e.g., a street number and a street name) associated with the job, a second text box 1028 for entering a zip code associated with the address, and a third selectable option 1030 for adding job details.

A selection of the third selectable option 1030 may cause the electronic device 800 to initiate presentation of the third GUI 1040. As shown in FIG. 10, the third GUI 1040 includes a builder identifier 1042 that indicates the builder selected using the first selectable option 1022 of the GUI 1020, a community identifier 1044 that indicates the community selected using the second selectable option 1024 of the GUI 1020, an address identifier 1046 that identifies the address input to the first text box 1026, a first selectable option 1048 (e.g., select category dropdown list) for selecting a category (e.g., one of the categories 410 of FIG. 4), a second selectable option 1050 for selecting a manufacturer of a product to be provided in connection with the new job (e.g., the job to be created in response to selection of the first selectable option 1010 of the first GUI 1000), and a third selectable option 1052 for adding item details (e.g., using the features described with reference to FIGS. 1-5, 8, and 9.

For example, when the electronic device 800 is used by a vendor that does not use the system 100 of FIG. 1, the vendor may use the features described with reference to FIG. 10 to create a job (e.g., using the GUIs 1000, 1020, and 1040), associated the job with a particular builder, and then select the third selectable option 1052 of the third GUI 1040 to enter specific product information (e.g., model number and/or serial number information). The specific product information may be entered using the second GUI 920 or the third GUI 930 of FIG. 9. The vendor may perform these actions just before, during, or after delivery and/or installation of the product depending on the visibility of the label information or other mechanisms used to capture the information. The information generated using the GUIs 1000, 1020, and 1030, in conjunction with the information captured using the GUIs 920 and 930, may be stored as a record at the integration server and may be accessible to the particular builder (e.g., for rebate purposes). The information may also be accessible to the respective manufacturer.

The various GUIs described with reference to FIGS. 8-10 may facilitate third party verification of products delivered to and/or installed at a home site. This may further enable the builder to more accurately track the number of rebates that the builder is entitled to redeem (i.e., because the information is stored at the integration server even when the vendor does not utilize the system 100). Additionally, this may increase the number of rebates the builder is able to redeem (i.e., because the information stored at the integration server may not otherwise tell the builder the specific product provided). Similar benefits may be provided to manufacturers. For example, the manufacturers may be able to better track movement of their products through the supply chain because wholesalers and suppliers that do not use the system 100 of FIG. 1 may still provide information to the integration server. Additionally, because the serial numbers and other information are captured, the manufacturers may be able to more accurately identify the exact product provided to a particular home site (e.g., for product recall and targeted marketing purposes).

Referring to FIG. 11, additional illustrative aspects of graphical user interfaces that may be used to capture item data using an electronic device are shown. In FIG. 11, a first GUI 1100, a second GUI 11200, a third GUI 1130, a fourth GUI 1140, and the second GUI 820 of FIG. 8 is shown. As described with reference to FIG. 8, a selection of the first selectable option 828 may indicate that the information gathered in subsequently presented GUIs (e.g., the GUIs 1100, 1120, 1130, 1140 of FIG. 11) is to be stored at the integration server in association with the selected address (e.g., the address indicated in the box 826) or a PO or CO associated with the selected address.

To illustrate, in response to selection of the first selectable element 828 of the second GUI 820, the electronic device 800 (or the processor of the electronic device 800) may initiate presentation of the first GUI 1100 within the display area 802 of the display device. As shown in FIG. 11, the first GUI 1100 includes the location identifier 910 of FIG. 9, the select category option 912 of FIG. 9, the select manufacturer option 914 of FIG. 9, a first text box 1102, a first scan control 1104, a second text box 1106, a second scan control 1108, a take picture control 1110, an edit control 1112, and a save control 1114. The location identifier 910 may be populated based on the address selected (e.g., the address indicated by the box 826 when the first selectable option 828 was selected). The select category option 912 may be provided as a dropdown list and may present a list of product categories (e.g., the categories 410 of FIG. 4, sub-categories, other product group identifiers, or a combination thereof). The category may be associated with an industry (e.g., HVAC, plumbing, appliances, electrical, etc.) of the user of the electronic device 800, with a category of products (e.g., HVAC products, plumbing products, appliances, electrical components or services, etc.) that the user of the electronic device 800 provides. In some aspects, the user of the electronic device 800 may not be the provider of products or services and is merely capturing information (e.g., on behalf of a builder, a manufacturer, etc.). In these aspects, the user may select the category based on a product of interest (e.g., a product that the user is trying to capture information for). In an additional or alternative aspect, the category identified by the select category option 912 may be prepopulated based on other information, such as information included in a configured PO or CO that is retrieved from the integration server, or information (e.g., an industry associated with the user) included in the profile of the user's account, as described with reference to FIG. 12.

The user may manually type a model number of a product into the first text box 1102 or may select the first scan control 1104 to cause the electronic device 800 to attempt to read the model number from a barcode. For example, selection of the first scan control 1104 may initiate presentation of the second GUI 1120. As seen in FIG. 11, the second GUI 1120 is substantially similar to the second GUI 920 of FIG. 9 and shows the label 924 of FIG. 9 that includes the first barcode 926 and the second barcode 928. Selection of the first scan control 1104 may cause the electronic device 800 to initiate scanning of the label 924 for the model number, as described with reference to FIG. 9. In response to identifying the model number, the electronic device 800 may highlight the first barcode 926 using a highlight box 1122, and may provide a first prompt 1124 to indicate that the model number has been captured successfully. In an aspect, the second GUI 1120 may include a selectable control (not shown in FIG. 11) to cause the electronic device 800 to re-present the first GUI 1100 or may automatically re-present the first GUI 1100 after successfully capturing the model number. The automatic re-presentation of the first GUI 1100 may be delayed briefly (e.g., one or more seconds) after presentation of the first prompt 1124 so that the user of the electronic device 800 is able to see the first prompt 1124.

The user may manually type a serial number of the product into the second text box 1106 or may select the second scan control 1108 to cause the electronic device 800 to attempt to read the serial number from a barcode. For example, selection of the second scan control may initiate presentation of the fourth GUI 1140. As seen in FIG. 11, the fourth GUI 1140 is substantially similar to the second GUI 920 of FIG. 9 and shows the label 924 of FIG. 9 that includes the first barcode 926 and the second barcode 928. Selection of the second scan control 1108 may cause the electronic device 800 to initiate scanning of the label 924 for the serial number, as described with reference to FIG. 9. In response to identifying the serial number, the electronic device 800 may highlight the second barcode 928 using a highlight box 1142, and may provide a second prompt 1144 to indicate that the serial number has been captured successfully. In an aspect, the fourth GUI 1140 may include a selectable control (not shown in FIG. 11) to cause the electronic device 800 to re-present the first GUI 1100 or may automatically re-present the first GUI 1100 after successfully capturing the serial number. The automatic re-presentation of the first GUI 1100 may be delayed briefly (e.g., one or more seconds) after presentation of the second prompt 1144 so that the user of the electronic device 800 is able to see the second prompt 1144.

In an aspect, selection of either the first scan control 1104 or the second scan control 1108 may cause the electronic device to attempt to capture both the model number and the serial number. If the model number and serial number are captured successfully, the highlight boxes 1122 and 1142 may be presented to highlight the captured model and serial numbers, respectively, and a prompt indicating both the model number and the serial number were successfully captured may be displayed. If the electronic device 800 is unable to capture the model number and/or serial number, a prompt indicating an error in reading the information from the label 924 may displayed and the user may be returned to the first GUI 1100 and prompted to manually enter the information (e.g., manually enter the model number and the serial number). By automatically attempting to capture both the model number and the serial number in response to selection of either the first scan control 1104 or the second scan control 1108, the number of user inputs and time required to capture the model number and serial number from the label 924 may be reduced and use of the electronic device 800 may be simplified.

Selection of the take picture control 1110 may cause the electronic device 800 to present the third GUI 1130. As shown in FIG. 11, the third GUI 1130 includes a capture image control 1132. Selection of the capture image control

1132 may cause the electronic device 800 to capture an image of the label 924 using the camera module, as described above with reference to FIG. 9. In an aspect, selection of the first scan control 1104 or the second scan control 1108 may cause the electronic device 800 to capture an image of the label 924 in addition to capturing the model number and/or the serial number. In an aspect, the electronic device 800 may capture the image of the label 924 upon successfully detecting the model number and/or the serial number. This may ensure that the image of the label 924 captured by the electronic device 800 include the information of interest (e.g., the first barcode 926 associated with the model number, the second barcode 928 associated with the serial number, or both).

Selection of the edit control 1112 may enable the user to edit the information included in the location identifier 910, the select category option 912, the select manufacturer option 914, the first text box 1102, the second text box 1106, and/or recapture the image of the label 924. Additionally, the selection of the edit control 1112 may enable the user to add additional information to the first GUI 1100, such as a job number, a PO number, a CO number, etc. Selection of the save control 1114 may cause the electronic device 800 to store the information included in the first GUI 1100 locally at a memory of the electronic device 800, at the integration server (e.g., the integration server 130 of FIG. 1), or both. In an aspect, selection of the save control 1114 may cause the electronic device 800 to capture updated geolocation information (e.g., an updated current location of the electronic device 800) and the updated geolocation information may be stored by the server in association with the other information described in connection with the various GUIs of FIGS. 8-12.

Capturing and storing model number and serial number information may provide or enable more accurate determinations that orders are being properly filled, and may enable a more accurate tracking of products through a supply chain. For example, the manufacturer may manufacture thousands of products with the same model number, but each of the products may have a unique serial number. If a portion of those products were made using components from a first vendor of the manufacturer and the components from the first vendor are the source of a product recall, the manufacturer may be able to provide recall notices to only those end consumers that received the product made using the components from the first vendor, while not providing notices to other end consumers who received the product made using components from a different vendor.

Additionally, by capturing the serial number information, the manufacturer may feel more confident that the builder actually qualifies for all of the rebates claimed. For example, the manufacturer may make thousands of products with the same model number, but each of the products may have a unique serial number. Thus, when the builder claims, for example, five hundred (500) rebates using the model number, the manufacturer has no way to verify that all five hundred (500) of the rebates are valid. However, if the manufacturer has access to information that identifies the five hundred (500) unique serial numbers corresponding the five hundred (500) products installed by the builder, the manufacturer may rest assured that the rebates are validly claimed by the builder. This may reduce an amount of rebates that the manufacturer pays that were not valid (e.g., the builder claims five hundred (500) rebates but only qualified for four hundred (400) and claimed five hundred (500) through record keeping errors). Additionally, this may help a builder prove up rebates that the builder is claiming when questioned by a manufacturer. Thus, the features provided by the electronic device 800, as described with reference to FIGS. 8 and 9, may provide an improved system for tracking rebate information.

Additionally, although described with reference to barcodes, other optically machine-readable codes may be used. For example, the electronic device 800 may be configured to read linear barcodes (e.g., two width linear barcodes and many-width linear barcodes) and matrix barcodes (e.g., quick response (QR) codes), or any other type of optically machine-readable codes. Additionally, the electronic device 800 may be configured to capture the information of interest (e.g., model number, serial number, etc.) using other technologies, such as radio frequency identification (RFID) tags, depending on the particular environment in which the integration server and/or the electronic device 800 are deployed.

Further, the electronic device 800 and the GUIs described with reference to FIGS. 8 and 9 may be used by a builder to validate and/or collect information associated with products provided by multiple vendors in connection with the construction of a home. For example, the builder may build a home and during the construction process may utilize dozens of different vendors. Some of the vendors may use the application and/or the web browser application described with reference to FIGS. 1-3 to generate, transmit, receive, and configure/update POs and COs. The electronic device 800 may also be used by such vendors to complete the providing of the products associated with a particular PO (e.g., by scanning and storing information captured from a label of the installed or provided product at the integration server), as described with reference to FIGS. 8 and 9. However, some of the vendors used by the builder to build the home may not utilize the system 100 of FIG. 1. Thus, the builder may not be sure that these vendors provided the correct products. The builder, and/or a third party (e.g., a manufacture, wholesaler, supplier, etc.), may visit the home site and use the electronic device 800 to capture item data (or enter item data) by scanning labels on the products installed or delivered to the home site. This may enable the builder and/or the third party to verify and validate the products provided by vendors that do not use the system 100 of FIG. 1. As another example, the builder may require or incentivize the vendors that are not using the system 100 of FIG. 1 to use an electronic device 800, such as, for example, by paying the vendors an additional amount for utilizing the electronic device 800 to capture item data. As yet another example, manufacturers may require or incentivize (e.g., using rebates or product price discounts) suppliers and wholesalers to use the electronic device 800.

Additionally, because the configured PO or configured CO may include the model number, the model number captured by the electronic device 800 may enable the builder to identify products that were provided by vendors in error. This may enable the builder to more quickly identify the errors and correct the errors prior to the end consumer becoming aware of the error. This may reduce costs for the builder as well since the builder is able to point to the configured PO and indicate that the model number specified in the order was a first model number while the vendor provided a product having a second model number that is different from the first model number. Additionally, because change orders may not be processed in a timely fashion by vendors, the vendor may arrive at a home site to provide a product according to a configured PO, and upon scanning the product using the electronic device 800, may be made aware of the error. For example, the electronic device 800 may cross-reference the model number with the PO and CO for the address based on the information provided to the electronic device and indicate to the vendor that there is a CO that changed the product to be provided. This may reduce the amount of time spent correcting the error by the vendor.

Figure 12:
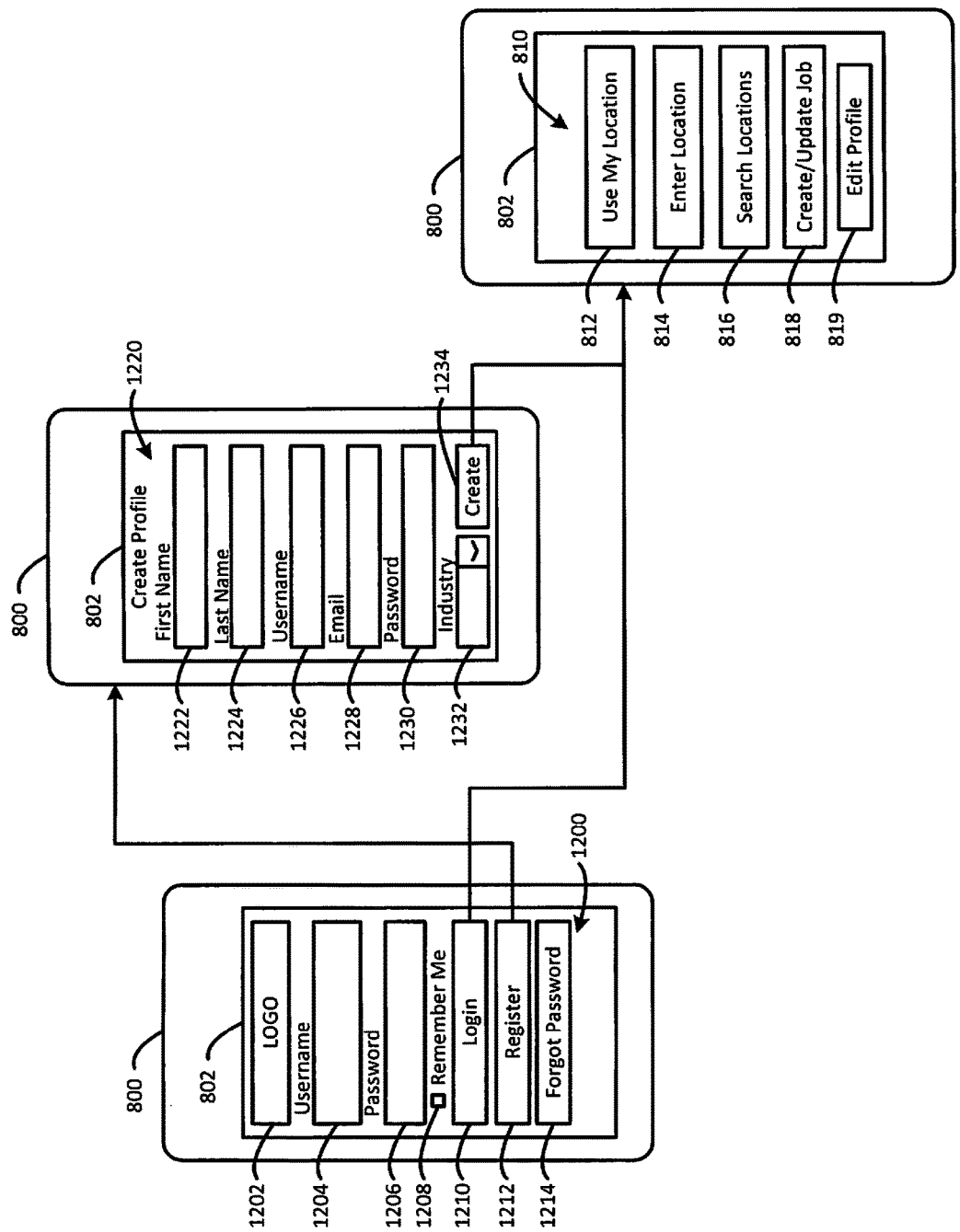
FIG. 12 shows illustrative aspects of graphical user interfaces that may be used to authenticate a user and create a user account at an electronic device are shown

Referring to FIG. 12, illustrative aspects of graphical user interfaces that may be used to authenticate a user and create a user account at an electronic device are shown. In FIG. 12, a first GUI 1200, a second GUI 1220, and the first GUI 810 of FIG. 8 are shown. The first GUI 1200 includes a first text box 1204 for inputting a username, a second textbox 1206 for inputting a password, a checkbox 1208, a login control 1210 for initiating a login to an application (e.g., the application described with reference to FIGS. 8-11 or FIGS. 1-3, or both) using a username provided in the first textbox 1204 and a password provided in the second textbox 1206, a register control 1212 for creating a new account for the application, and a forgot password control 1214 for recovering a password associated with the user name provided via the first textbox 1204. In an aspect, the first GUI 1200 may include a logo portion 1202 for presenting a logo. The logo may be a logo of a builder, a logo of a vendor, a logo of a manufacturer, a logo of a wholesaler, a logo of a supplier, a logo of a retailer, or a logo of a company that provides the application.

The first GUI 1200 may be used to authenticate an account of a user of the electronic device 800. In an aspect, the authentication may be performed by a server, such as the integration server 130 of FIG. 1. Once authenticated, the user of the electronic device 800 may be provided with access to the features of the electronic device 800 described with reference to FIGS. 8-11. Upon successful authentication, the electronic device 800 may present a home screen, such as the first GUI 810 of FIG. 8.

As shown in FIG. 12, selection of the register control 1212 may initiate presentation of the second GUI 1220. The second GUI 1220 includes a first textbox 1222 for entering a first name, a second text box 1224 for entering a last name, a third textbox 1226 for entering a desired username, a fourth textbox 1228 for entering an e-mail address, a fifth textbox for entering a desired password, an industry selection control 1232, and a create account control 1234. In an aspect, the industry selection control 1232 may enable the user to specify a category of services or products that the user provides. For example, the user may be a vendor that provides plumbing services and products to builders and the user may select a category of "plumbing" from a dropdown menu provided in response to selection of the industry selection control. By specifying an industry associated with the user of the electronic device 800 in the profile of the user, the electronic device 800 may provide more efficient interactions. For example, information (e.g., the select category option 912 and the category identifier 934 of FIGS. 9 and 11, the first selectable option 1048 of FIG. 10, etc.) may be pre-populated in one or more of the GUIs described with reference to FIGS. 8-11 based on the industry specified by the industry selection control 1232. Additionally, the industry specified by the industry selection control 1232 or other information included in the profile may be used to pre-populate fields of POs or COs or may be used to filter addresses, products, jobs, etc.

Selection of the create account control 1234 may cause the electronic device 800 to present the home screen (e.g., the first GUI 810 of FIG. 8). Additionally, selection of the create account control 1234 may cause the electronic device 800 to transmit information to a server (e.g., the integration server 130 of FIG. 1) and the server may generate the account and store information associated with the account at the server. The information stored at the server may be used to authenticate the user during subsequent logins.

In an aspect, the second GUI 1220 may be associated with other GUIs or elements configured to capture additional information, such as payment information, address information, telephone contact information, etc. Additionally, although the second GUI 1220 includes the third textbox 1226 for entering a desired username, in an aspect, the user's email address, provided via the fourth textbox 1228 may be used as the username. The application may further provide additional features, such as a change password feature, an edit profile feature, etc. and such additional features may be provided via one or more additional GUIs (not shown). Further, although illustrated as enabling the user to select a single industry, in some aspects, the user may select more than one industry or no industry. For example, some vendors may provide more than one category of product, such as HVAC services and products, and plumbing services products, while other vendors may not provide any products or services, such as third party user hired by the builder to scan products provided to homes built by the builder. The third party may also be a vendor that utilizes an electronic device 800 of the builder to capture the item information. For example, the builder may maintain one or more electronic devices 800 at a model home or other location and vendors that do not use the system 100 of FIG. 1 or have their own electronic device 800 may use the one or more electronic devices 800 of the builder to capture information for the builder. In such a scenario, the industry associated with the user capturing the information may vary depending on which vendor is borrowing the electronic device 800. Thus, it may be advantageous to not associate a particular industry with an account in some deployments of the electronic device 800.

Figure 13:
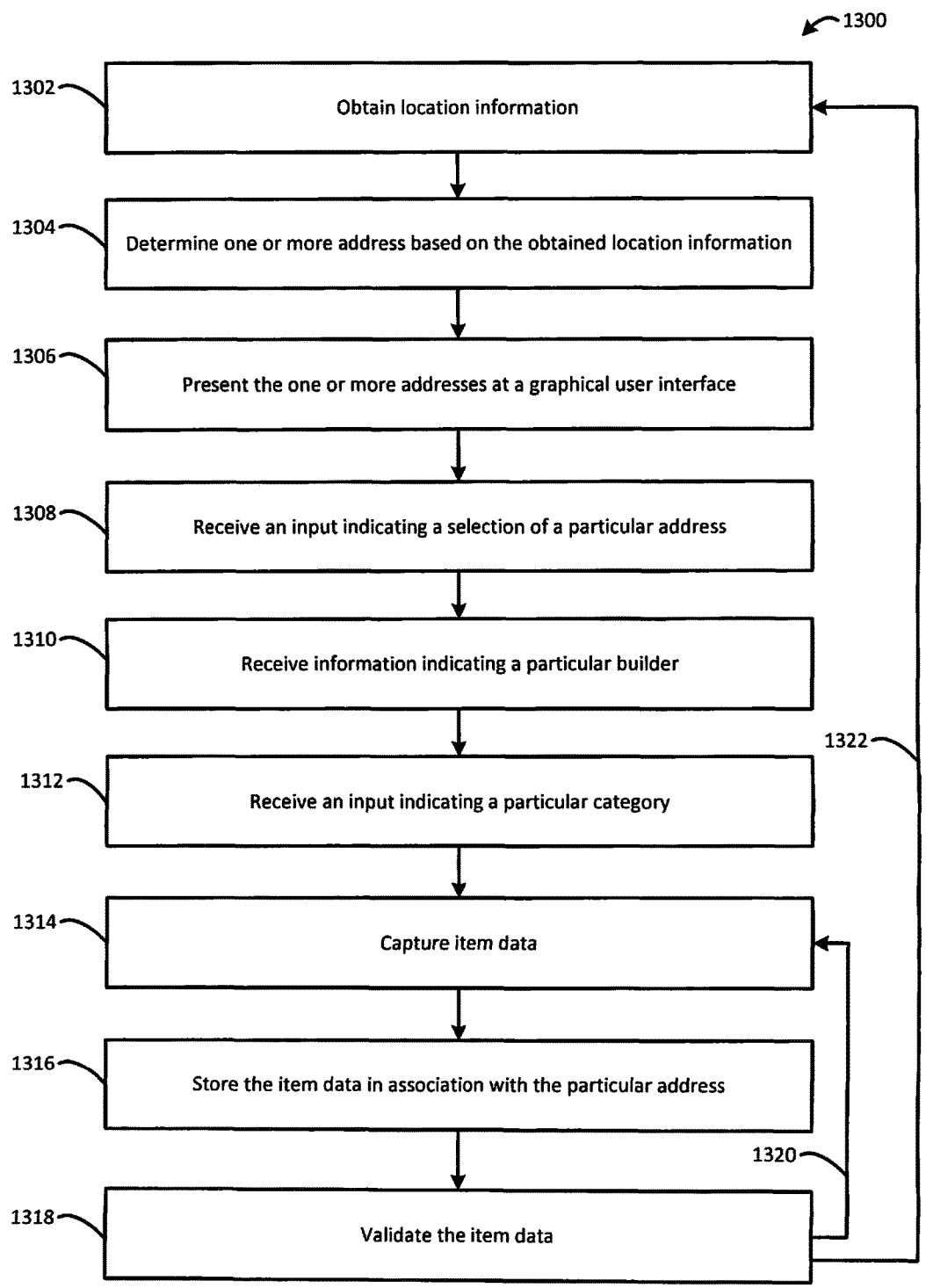
FIG. 13 shows illustrative aspects of a method 1300 for gathering product information at a home site.

Referring to FIG. 13, illustrative aspects of a method 1300 for gathering product information at a home site is shown. In an aspect, the method 1300 may be performed by an electronic device (e.g., the electronic device 800 of FIG. 8) having a processor and a memory storing instructions that, when executed by the processor, cause the processor to perform operations associated with the method 1300. At 1302, the method 1300 includes obtaining location information. In an aspect, the location information may correspond to a current location of the electronic device, and may be determined by a geographic information system (GIS), as described with reference to FIG. 8. In an additional or alternative aspect, the location information may be determined using the third GUI 840 of FIG. 8, or the fourth GUI 860 of FIG. 8, the first text box 1026 of the GUI 1020 of FIG. 10, or another GUI. At 1304, the method 1300 includes determining one or more addresses based on the location information. In an aspect, the one or more addresses may be determined based on a current location of the electronic device. For example, the one or more addresses may be determined to be within a threshold distance (e.g., ½ mile, 1 mile, 2 miles, etc.) of the current location of the electronic device.

At 1306, the method 1300 includes presenting the one or more addresses at a graphical user interface (GUI). In an aspect, the one or more addresses may be presented at the second GUI 820 of FIG. 8, or via an interactive map, as described with reference to FIG. 8. At 1308, the method 1300 includes receiving an input indicating a selection of a particular address. In an aspect, the input may be received via the first selectable option 828 of the second GUI 820 of FIG. 8 and the particular address may be indicated using the box 826, as described with reference to the second GUI 820 of FIG. 8. At 1310, the method 1300 includes receiving information indicating a particular builder. In an aspect, the information indicating the particular builder may be received via the first selectable option 842 of the third GUI 840 of FIG. 8, via the first selectable option 862 of the fourth GUI 860 of FIG. 8, or via an input provided via another interface (e.g., any one of the interfaces described with reference to FIGS. 8-10 or another interface). At 1312, the method 1300 includes receiving an input indicating a particular category. The particular category may be a category of a product to be provided to the particular address selected at 1308. In an aspect, the categories may be the categories 410 of FIG. 4 and may be received via the second selectable option 912 of the GUI 900 of FIG. 9, the first selectable option 1048 of the GUI 1040 of FIG. 10, or another GUI.

At 1314, the method 1300 includes capturing item data. In an aspect, the item data may be captured using the GUI 920 of FIG. 9 or the GUI 930 of FIG. 9. The item data may include a serial number and/or a model number of the product to be provided to the particular address selected at 1308, and may include other information associated with the product. In an additional or alternative aspect, the item data may be captured using an interface different from the GUIs 920, 930, such as using an RFID interface. At 1316, the method 1300 includes storing the item data in association with the particular address. In an aspect, the item data may further bet stored in association with a PO, a CO, a job number, the builder indicated at 1310, or based on another association.

At 1318, the method 1300 includes validating the item data. In an aspect, validating the item data may include verifying that a model number of the product indicated in a configured PO matches the model number captured at 1314. When the validation of the item data fails, the method 1300 may include capturing the item data again, at 1314, as indicated by the arrow 1320. When the validation of the item data is successful, the method 1300 may include obtaining location information (e.g., for validating item data for a different product, or products at a different location, different builder, different category, etc.), as indicated by the arrow 1322.

The method 1300 may provide one or more of the benefits of the system 100 of FIG. 1, as described with reference to FIGS. 1-7, and/or the benefits of the electronic device 800, as described with reference FIGS. 8-10. For example, the method 1300 may provide increased accuracy for both builders and manufacturers with respect to rebates, since information may be captured event when vendors do not use the system 100 of FIG. 1. Additionally, the method 1300 may provide more detailed information to manufacturer regarding the exact products (e.g., via the serial number) provided to a particular location, such as a home. Other features and benefits have been described with reference to FIGS. 1-13 and repeated here for conciseness of the disclosure.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate, from this disclosure, other processes, machines, manufacture, compositions of matter, means, methods, or steps, presently existing or later to be developed that may perform substantially the same function or achieve substantially the same result as the corresponding embodiments described herein and that may be utilized according to the present invention. Accordingly, the appended claims are intended to include within their scope such processes, machines, manufacture, compositions of matter, means, methods, or steps, and equivalents thereof.

What is claimed is:

1. A method for improving accuracy of rebate claims and tracking distribution of items, the method comprising:

determining, by a processor of a mobile device, location information associated with a location of the mobile device;

transmitting, by the mobile device, the location information to an integration server;

receiving, by the mobile device, address information from the integration server in response to transmission of the location information, wherein the address information identifies a community in which one or more homes are being constructed, addresses associated with each of the one or more homes being constructed in the community, and a builder associated with each of the one or more homes being constructed in the community;

presenting, by the processor at a display of the mobile device, the addresses associated with each of the one or more homes being constructed in the community as selectable elements within a first graphical user interface;

receiving, by the processor, an input indicating selection of a particular selectable element within the first graphical user interface, wherein the input indicates selection of a particular address corresponding to a particular home of the one or more homes being constructed in the community, the particular home associated with a particular builder;

in response to receiving the input indicating selection of the particular address, receiving, by the processor, a second input corresponding to a request to capture item data that specifically identifies a product installed at the particular home by a vendor in response to a purchase order from the particular builder;

in response to the second input:
  acquiring, by a camera communicatively coupled to the processor, image data representative of a label of the product installed at the home by the vendor;
  analyzing, by the processor, the image data to determine whether the label includes new product information and/or redundant product information, wherein the redundant product information corresponds to information previously included in the purchase order, and wherein the new product information corresponds to information comprising at least one of a model number and a serial number that is not included in the purchase order;
  executing, by the processor, a barcode capability to extract item data from a barcode included on the label, the extracted item data corresponding to the new product information; and
  transmitting, by a communication module communicatively coupled to the processor, the extracted item data to the integration server;

receiving, at the integration server, the extracted item data;

updating, by the integration server, a record in a database accessible to the integration server, wherein the updating of the record links the extracted item data with the particular address of the particular home; and periodically generating, by the integration server, one or more rebate reports on behalf of the particular builder, wherein at least one of the rebate reports identifies a number of rebate claims that the builder is entitled to claim from a manufacturer for installing a threshold quantity of a particular product made by the manufacturer in homes built by the builder, wherein the number of rebate claims is determined by identifying a number of homes built by the builder and in which the threshold quantity of the particular product was installed based on the records that link the extracted item data corresponding to products installed in the homes built by the builder with the addresses of the homes built by the builder, and wherein the rebate report includes information that provides the manufacturer with the addresses of the homes built by the builder in which the threshold quantity of the particular product was installed.

2. The method of claim 1, further comprising searching, by the integration server, the database based on the location information to identify the addresses.

3. The method of claim 1, wherein the item data that specifically identifies the product includes a serial number of the product, wherein the extracted item data is captured from a still image of the barcode, and wherein the method includes transmitting, by the communication module, the record linking the extracted item data with the particular address of the particular home to a server associated with the vendor.

4. The method of claim 1, wherein the item data that specifically identifies the product includes a model number of the product, wherein the extracted item data is captured from a still image of the barcode, and wherein the method includes transmitting, by the communication module, the record linking the extracted item data to a server associated with the vendor.

5. The method of claim 1, wherein the item data is acquired by the builder.

6. The method of claim 1, wherein the item data is acquired by the vendor.

7. The method of claim 1, wherein the location information corresponds to a current location of the mobile device and is generated by a geographical information system of the mobile device.

8. The method of claim 1, wherein the method includes:
receiving an input indicating a manufacturer of the product; and
receiving an input indicating a category associated with the product, wherein the captured item data indicates the manufacturer and the category.

9. The method of claim 1, wherein the method includes presenting a selectable option to use a graphical user interface to capture the extracted item data in response to determining that a serial number associated with the product cannot be extracted by the barcode capability of the mobile device.

10. The method of claim 1, wherein the image data representative of the label of the product is captured during installation of the product by the vendor, the method further comprising:
validating information derived from the label to determine whether the particular product being installed by the vendor is a correct, wherein the validating comprises:
determining, based on information stored in the database, whether the purchase order comprises information that identifies the model number of the particular product; and
verifying that the model number identified in the purchase order matches the model number derived from the label.

11. A non-transitory computer-readable storage medium storing instructions that, when executed by a processor, cause the processor to perform operations for improving accuracy of rebate claims and tracking distribution of items, the operations comprising:
receiving location information;
transmitting the location information to an integration server, wherein the integration server is configured to store information corresponding to construction of homes within one or more communities;
receiving address information from the integration server in response to transmission of the location information, wherein the address information identifies a community in which one or more homes are being constructed, addresses associated with each of the one or more homes being constructed in the community, and a builder associated with each of the one or more homes being constructed in the community;
presenting, at a display of a mobile device, the addresses associated with each of the one or more homes being constructed in the community as selectable elements within a first graphical user interface; and
in response to receiving an input indicating selection of a particular selectable element within the first graphical user interface, receiving a second input corresponding to a request to capture item data that specifically identifies a particular product installed at a particular home by a vendor, the particular home corresponding to a particular address associated with the particular selectable element, and wherein the particular product is installed at the home by the vendor in response to a purchase order from a particular builder;
in response to receiving the second input:
acquiring, by a camera communicatively coupled to the processor, image data representative of a label of the particular product installed at the particular home by the vendor;
analyzing the image data to determine whether the label includes new product information and/or redundant product information, wherein the redundant product information corresponds to information previously included in the purchase order, and wherein the new product information corresponds to information comprising at least one of a model number and a serial number that is not included in the purchase order;
executing a barcode capability to extract item data from a barcode included on the label, the extracted item data corresponding to the new product information;
updating a record in a database accessible to the integration server, wherein the updating of the record links the captured item data with the particular address of the particular home; and
periodically generating one or more rebate reports for the particular builder, wherein at least one of the rebate reports identifies a number of rebate claims that the builder is entitled to claim from a manufacturer for installing a threshold quantity of a particular product made by the manufacturer in homes built by the builder, wherein the number of rebates is determined by identifying, based on the records stored in the database accessible to the integration server, a number of homes built by the particular builder in which the threshold quantity of the particular product was installed based on the records that link the extracted item data corresponding to products installed in the homes built by the builder with the addresses of the homes built by the builder, and wherein the rebate report includes information that provides the manufacturer with the addresses of the homes built by the builder in which the threshold quantity of the particular product was installed.

12. The non-transitory computer-readable storage medium of claim 11, wherein the item data that specifically identifies the particular product includes a serial number of the particular product, wherein the extracted item data is captured from a still image of a barcode, and wherein updating the record in the database includes transmitting the record linking the extracted item data with the particular address of the particular home to a server associated with the vendor.

13. The non-transitory computer-readable storage medium of claim 11, wherein the item data is acquired by the builder.

14. The non-transitory computer-readable storage medium of claim 11, wherein the operations include:
receiving a request to create a new job;
presenting, at the display of the mobile device, a second graphical user interface including a plurality of selectable options for configuring the new job, wherein the plurality of selectable options includes at least one of a select builder option, a select category option, a select community option, a select manufacturer option, and a select address option;
receiving inputs via the second graphical user interface to configure the new job; and
storing information associated with a configuration of the new job at the database.

15. The non-transitory computer-readable storage medium of claim 11, wherein the image data representative of the label of the particular product is captured during installation of the particular product by the vendor, the operations further comprising:
validating information derived from the label to determine whether the particular product being installed by the vendor is a correct, wherein the validating comprises:
determining, based on information stored in the database, whether the purchase order comprises information that identifies the model number of the particular product; and
verifying that the model number identified in the purchase order matches the model number derived from the label.

16. A system for improving accuracy of rebate claims and tracking distribution of items, the operations comprising:
an integration server; and
a mobile device comprising:
a first processor;
a camera communicatively coupled to the first processor;
a display device;
a first communication module communicatively coupled to the first processor; and
a first memory communicatively coupled to the first processor, the first memory storing instructions that, when executed by the first processor, cause the first processor to perform operations comprising:
determining location information associated with a location of the mobile device;
transmitting the location information to the integration server;
receiving address information from the integration server in response to transmission of the location information, wherein the address information identifies a community in which one or more homes are being constructed, addresses associated with each of the one or more homes being constructed in the community, and a builder associated with each of the one or more homes being constructed in the community;
presenting, at the display device, the addresses associated with each of the one or more homes being constructed in the community as selectable elements within a first graphical user interface;
in response to receiving an input indicating selection of a particular selectable element within the first graphical user interface, receiving a second input corresponding to a request to capture item data that specifically identifies a particular product installed by a vendor at a particular home corresponding to a particular address associated with the particular selectable element, and wherein the particular product is installed at the particular home by the vendor in response to a purchase order from a particular builder;
in response to the second input:
acquiring, by the camera communicatively coupled to the first processor, image data representative of a label of the particular product installed at the particular home by the vendor;
analyzing image data to determine whether the label includes new product information and/or redundant product information, wherein the redundant product information corresponds to information previously included in the purchase order, and wherein the new product information corresponds to information comprising at least one of a model number and a serial number that specifically identifies the particular product installed in the particular home by the vendor and is not included in the purchase order;
executing a barcode capability to extract item data from a barcode included on the label, the extracted item data corresponding to the new product information; and
transmitting, by the first communication module, the extracted item data to the integration server associated with the builder,
wherein the integration server comprises:
a second processor;
a second communication module communicatively coupled to the second processor and configured to communicatively couple the integration server to the mobile device via a network communication link; and
a second memory communicatively coupled to the second processor, the second memory storing:
a database configured to store information corresponding to construction of homes within one or more communities, wherein the information corresponding to construction of the homes includes information provided by builders constructing homes in each of the one or more communities and information provided by vendors in connection with work performed during construction of the homes at the request of the builders;

instructions that, when executed by the second processor, cause the second processor to perform operations comprising:

receiving, by the second communication module, the extracted item data from the mobile device;

updating a record in the database, wherein the updating of the record links the extracted item data with the particular address of the particular home; and periodically generating one or more rebate reports for the particular builder in response to a request to prove rebate eligibility, wherein at least one of the rebate reports identifies a number of rebate claims that the particular builder is entitled to for installing a threshold quantity of a particular product made by a manufacturer in homes built by the builder, wherein the number of rebate claims is determined by identifying, based on the records stored in the database, a number of homes built by the particular builder in which the threshold quantity of the particular product was installed based on the records that link the extracted item data corresponding to products installed in the home with the addresses of the homes built by the builder, and wherein the rebate report includes information that provides the manufacturer with the addresses of the homes built by the builder in which the threshold quantity of the particular product was installed.

17. The system of claim 16, wherein the item data that specifically identifies the particular product includes a serial number of the particular product, wherein the extracted item data is captured from a still image of a barcode.

18. The system of claim 16, wherein the item data is acquired by the builder.

19. The system of claim 16, wherein the operations performed by the first processor include:

receiving a request to create a new job;

presenting, at the display device, a second graphical user interface including a plurality of selectable options for configuring the new job, wherein the plurality of selectable options includes at least one of a select builder option, a select category option, a select community option, a select manufacturer option, and a select address option;

receiving inputs via the second graphical user interface to configure the new job; and storing information associated with a configuration of the new job at the database.

20. The system of claim 16, wherein the image data representative of the label of the particular product is captured during installation of the particular product by the vendor, the operations performed by the first processor further comprising:

validating information derived from the label to determine whether the particular product being installed by the vendor is a correct, wherein the validating comprises:

determining, based on information stored in the database, whether the purchase order comprises information that identifies the model number of the particular product; and verifying that the model number identified in the purchase order matches the model number derived from the label.

* * * * *